United States Patent
Dsouza et al.

(10) Patent No.: US 11,488,231 B1
(45) Date of Patent: Nov. 1, 2022

(54) SYSTEMS AND METHOD FOR AN APPLICATION FOR UPDATING VIRTUAL CARTS

(71) Applicant: Amazon Technologies, Inc., Seattle, WA (US)

(72) Inventors: Dorwin Richard Dsouza, Seattle, WA (US); Shruti Mathure, Seattle, WA (US); Brandon Walker, Seattle, WA (US); Joel Brazle, Seattle, WA (US); Uma Devi Bhatraju, Redmond, WA (US); Shannon Quek, Seattle, WA (US); Jack Chung, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 652 days.

(21) Appl. No.: 15/709,122

(22) Filed: Sep. 19, 2017

(51) Int. Cl.
*G06Q 30/00* (2012.01)
*G06Q 30/06* (2012.01)
*G06K 7/10* (2006.01)
*G06V 20/62* (2022.01)
*G06V 40/10* (2022.01)
*G06V 40/16* (2022.01)
*G06F 3/0482* (2013.01)

(52) U.S. Cl.
CPC ..... *G06Q 30/0633* (2013.01); *G06K 7/10861* (2013.01); *G06V 20/62* (2022.01); *G06V 40/103* (2022.01); *G06V 40/172* (2022.01); *G06F 3/0482* (2013.01); *G06Q 30/0601* (2013.01)

(58) Field of Classification Search
CPC . G06Q 30/0633; G06Q 30/0601–0645; G06K 7/10861
USPC ................................................ 705/26.1–27.2
See application file for complete search history.

(56) References Cited

U.S. PATENT DOCUMENTS

| | | | |
|---|---|---|---|
| 7,780,081 B1 * | 8/2010 | Liang | G06Q 30/0633 235/383 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,368,057 B1 * | 7/2019 | Saran | H04N 13/275 |

(Continued)

OTHER PUBLICATIONS

Corporate safe specialists to demo self check-out solution at KioskCom.com. (Apr. 10, 2005). Wireless News Retrieved from https://dialog.proquest.com/professional/docview/209954290?accountid=131444 (Year: 2005).*

(Continued)

*Primary Examiner* — Allison G Wood
*Assistant Examiner* — Ashley D Preston
(74) *Attorney, Agent, or Firm* — Lee & Hayes, P.C.

(57) ABSTRACT

This disclosure describes techniques for utilizing sensor data to automatically determine the results of events within a system, as well as utilizing associate applications of human associates to supplement the sensor data. Upon receiving sensor data indicative of an event, the techniques may analyze the sensor data to determine a result of the event, such as that a particular user associated with a user identifier selected a particular item associated with an item identifier. Contents of a virtual shopping cart of the user may be maintained based on this automated analysis of sensor data. In addition, a human associate may interact with the particular user to further modify the virtual shopping cart.

19 Claims, 12 Drawing Sheets

(56) References Cited

U.S. PATENT DOCUMENTS

| | | | | |
|---|---|---|---|---|
| 2003/0013459 A1* | 1/2003 | Rankin | ............... | G07C 1/20 |
| | | | | 455/456.1 |
| 2010/0179857 A1* | 7/2010 | Kalaboukis | ........ | G06Q 30/0601 |
| | | | | 705/7.31 |
| 2013/0284806 A1 | 10/2013 | Margalit | | |
| 2015/0012426 A1* | 1/2015 | Purves | ............ | G02B 27/017 |
| | | | | 705/41 |
| 2015/0025967 A1* | 1/2015 | Ellison | ............ | G06Q 30/0267 |
| | | | | 705/14.53 |
| 2016/0140631 A1* | 5/2016 | Scrivner | ........ | G06Q 30/0601 |
| | | | | 705/26.1 |
| 2016/0171486 A1* | 6/2016 | Wagner | ........ | G06Q 20/3278 |
| | | | | 705/39 |
| 2017/0186072 A1* | 6/2017 | Clark | ............ | G06Q 30/0633 |
| 2017/0287053 A1* | 10/2017 | Page | ............ | G06Q 30/0633 |
| 2019/0057435 A1* | 2/2019 | Chomley | ............ | B62B 3/14 |

OTHER PUBLICATIONS

NCR introduces next-generation self-checkout solution. (May 5, 2008). Business Wire Retrieved from https://dialog.proquest.com/professional/docview/1069800434?accountid=131444 (Year: 2008).*

* cited by examiner

SYSTEMS AND METHOD FOR AN APPLICATION FOR UPDATING VIRTUAL CARTS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4A illustrates an example of the materials handling facility that includes multiple scanning devices that each associate of the facility may use to provide the system with a current location of the respective associate. This location data, in turn, may be used to help determine users that are proximate the associate and thus allow the associate to identify the user that he or she is currently interacting with.

FIGS. 4B-C illustrates example UIs that the associate application may present, for example, in response to the associate scanning his or her identifier at one of the scanning devices of FIG. 4A. In response to the associate scanning his or her identifier, the system may identify those users that within a defined region of the location of the associate, may retrieve images of these users (e.g., as captured upon the respective user's entry into the facility), and may send these images to the associate application. The associate may then select the image of the user he or she is currently interacting with.

FIG. 6 illustrates a flow diagram of an example process for enabling an associate to identify a customer that he or she is currently interacting with.

FIG. 7 illustrates a flow diagram of another example process for enabling an associate to identify a customer that he or she is currently interacting with.

DETAILED DESCRIPTION

Figure 1:
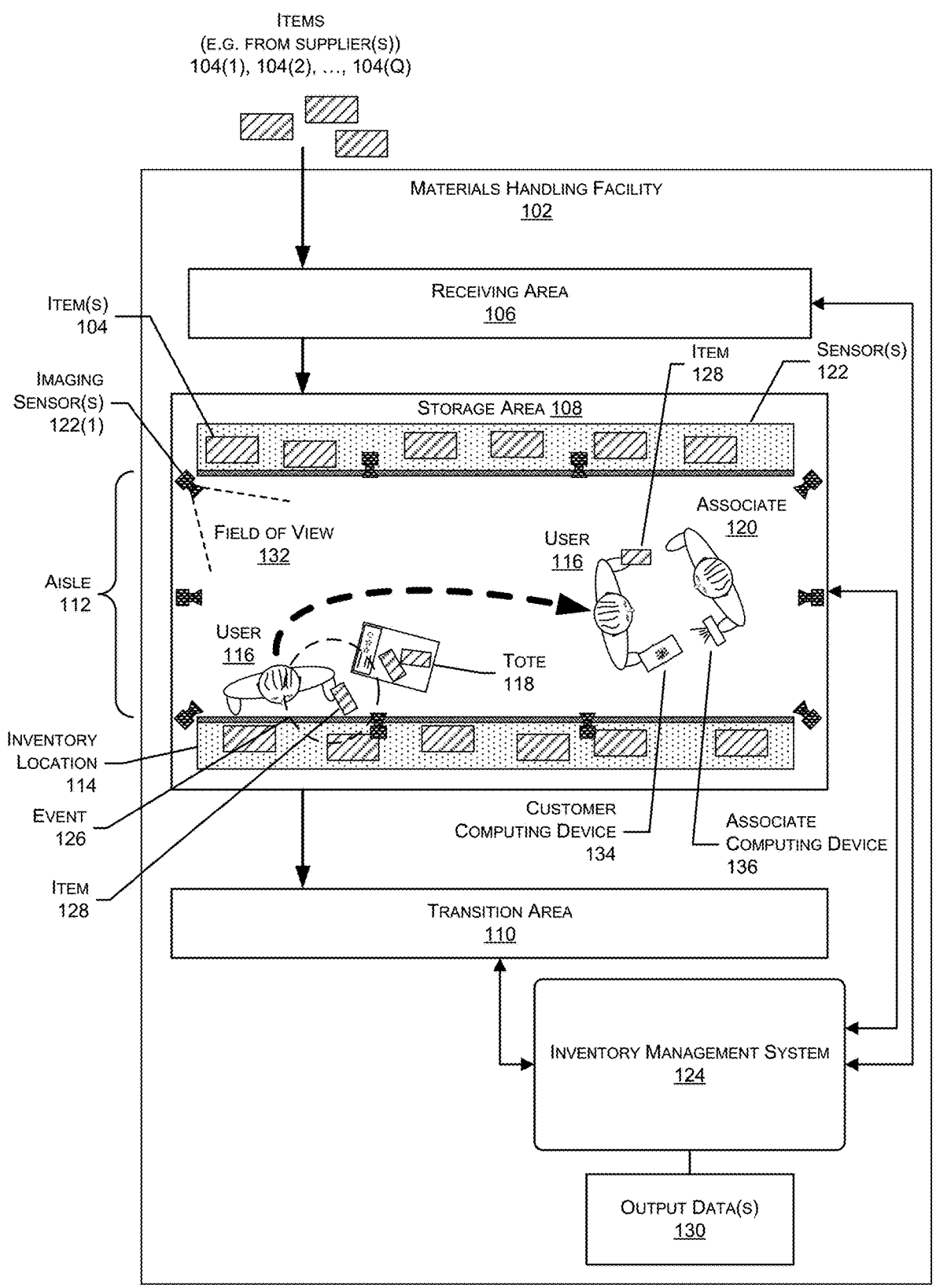
FIG. 1 is a block diagram of a materials handling facility that includes sensors and an inventory management system configured to generate output regarding events occurring in the facility using the sensor data, such as a user picking an item or returning an item. In some instances, the inventory management system maintains a state of virtual shopping cart of each user in the facility using the sensor data. In addition to updating the virtual shopping carts using the sensor data, the facility may also include associates utilizing applications on mobile devices to update these virtual shopping carts.

This disclosure describes systems and techniques for detecting events occurring within a materials handling facility (facility) and updating virtual shopping carts of respective users based on the detected events. In addition, this disclosure describes systems and techniques for updating the virtual shopping carts using associate applications executing on mobile computing devices operated by associates of the facility.

The facility may include, or have access to, an inventory management system. The inventory management system may be configured to maintain information about items, users, condition of the facility, and so forth. For example, the inventory management system may maintain data indicative of a result of different events that occur within the facility, such as what items a particular user picks or returns, location of the particular user, availability of a user providing support services to others, requests for assistance, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event, as well as information provided by an associate of the facility via an associate application executing on an associate computing device. Further, it is to be appreciated that analysis of first data associated with an event may produce a first result. However, analysis of second data associated with the same event may produce a second result. Further, because these results are essentially calculated hypotheses of what the actual real-world result of the event was, the produced results may differ from one another and, potentially, from the real-world result of the real-world event.

Operation of the inventory management system may be supported by sensor data acquired by one or more sensors. The sensor data may include image data acquired by imaging devices such as cameras, information acquired from radio frequency tags, weight sensors, and so forth. In addition, operation of the inventory management system may be supported by data received from associate applications based on input by corresponding associates.

The inventory management system may determine, using the sensor data or the data received from the associate applications, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, it may be advantageous to use human input to generate or confirm the output data. In these situations, inquiry data may be provided to an associate service that provides the inquiry data to one or more devices associated with one or more associates supporting operation of the facility.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative results of the events. For example, the tentative results may comprise the possible results associated with the event as generated by the inventory management system. Continuing the example, tentative results may comprise a list of the possible items the user may be interacting with. The response data may comprise data indicative of a selection by the associate of one or more of the tentative results. The response data may then be used to update the virtual shopping cart of a user, similar to how a virtual shopping cart may be updated after automatically determining this information.

As described above, the facilities described herein may include an array of sensors to identify events that occur within the facilities, such as customers picking items from the shelves, returning items to the shelves, or the like. When customers pick items from shelves, item identifiers corresponding to the items may be added to the customers' respective virtual carts. When the users return items to the shelves, the item identifiers corresponding to the returned items may be removed from the customers' respective virtual carts. When the customers exit the facility with their items, meanwhile, payment instruments previously associated with these customers may be identified and may be charged respective amounts corresponding to the items in the customers' respective virtual carts. Further, receipt data for the items acquired may be send to the customer computing device.

In some instances, however, customers may interact with associates within the facilities to pick or return items. In these instances, the associates may utilize respective associate applications executing on associate computing devices to add or remove item identifiers from the customers' virtual shopping carts. For instance, envision that a first customer picks a first item from a shelf within a facility that includes the described sensors. In response to picking the first item, the sensor data may be analyzed to identify the item identifier of the item, the quantity of the item, and the identity of the customer that picked the item. For example, overhead cameras, in-shelf cameras, weight sensors, locating techniques, and the like may be used to identify the item and amount of the item being picked, as well as the customer. In response to identifying this pick, the system may then add the item identifier to a virtual shopping cart of the customer, along with a quantity and a cost of the item.

After this information is added to the virtual shopping cart of the first customer, envision that the first customer wishes to return the item, but rather than replacing the item back on the shelf, the first customer returns the item to an associate (e.g., employee) of the facility. In this example, the associate may receive the to-be-returned item from the first customer utilize an associate computing device to remove the corresponding item identifier from the virtual shopping cart of the first customer.

To do so, the associate application executing on the associate computing device may need to identify the customer that is returning the item, the item being returned, the quantity of the item, and/or the like. The associate application and/or the inventory management system interacting with the associate application may receive data indicative of the identity of the customer in a number of ways. For instance, the associate computing device may include an imaging device (e.g., camera, scanning device, etc.) that is configured to acquire image data associated with a customer identifier associated with the customer, which may be used for identifying a virtual shopping cart associated with the customer. To provide an example, the first customer may utilize a customer application executing on a customer computing device for interacting with the facility and/or inventory management system. This same identifier may be used by the associate application to identify the customer. In some instances, the facility includes an entry location where customers enter the facility and that includes one or more imaging devices (e.g., cameras, scanners, etc.) that capture image data associated with the respective customer identifiers presenting on the respective customer computing devices via the respective customer applications. In one example, the image data associated with the customer identifier comprises a barcode, quick-response (QR) code, an alphanumeric string, or the like. This barcode, QR code, string, etc. may, in turn, be associated with a number or other data that uniquely identifies the customer. It is to be appreciated that this number or other data may be fixed over time or may change periodically or otherwise (e.g., a new customer identifier may be assigned each time the customer enters the facility).

In these examples, an imaging device proximate to the entry of the facility may scan a barcode (or the like) from the customer computing device of the first customer upon the first customer entering the facility. In response, the system may generate a session identifier associated with the customer identifier, with the session identifier being associated with a generated virtual shopping cart. In some instances, multiple customer identifiers may be associated with a single session identifier, such as the example where a family of four enters the facility and each of the four customer identifiers are associated with a common session identifier. Further, the first customer (and other customers) may then be located through to the facility and items picked by the first user may be added to the virtual shopping cart. If the first customer desires to return the first item to the associate, the associate may utilize the imaging device of the associate computing device to capture image data (e.g., take a picture of, scan, etc.) the customer identifier for identifying the customer.

After identifying the customer, the associate may input an item identifier associated with the item into the associate application. For example, the associate may use the imaging device to capture image data (e.g., scanning a barcode, capturing a full image, etc.) to identify the item being returned. In another example, the merchant may type or otherwise enter information for identifying the item to be return. Finally, the associate application may include a field that allows the associate to enter in how many instances of the first item are to be returned, as well as an icon for allowing the associate to request to "remove" the item identifier from the virtual shopping cart, or "add" the item to the shopping cart if the associate is locating items for the customer and providing these items to the first customer.

In addition to the identifying customers using customer identifiers presented on customer computing devices or other substrates (e.g., a physical card, etc.), in some instances the location of the associate operating the associate computing device may be utilized to identify the customer that the associate is currently interacting with. For example, envision that the first customer discussed above approaches an associate and requests to return the first item to the associate. The associate may operate the associate application on the associate computing device to attempt to identify the customer. For example, upon initiating the application the user-locating system within the facility may identify the current location of the associate (e.g., based on overhead cameras in the facility, location component(s) providing location components of the associate device, etc.) and may then identify one or more cameras having fields-of-view at least partly within a region around the associate location. The system may then send image data from these cameras to the associate computing device, which may present the image data on the display. In some instances, the application also presents a respective bounding box around each customer identified in the image data on the display along with a symbol for allowing the associate to select a particular customer as the customer the associate is interacting with. For example, if the image data depicts three customers, each customer represented in the image data may include a bounding box around the representation and a letter of A, B, or C (or the like), such that the associate can input which of Customer A, B, or C is the first customer requesting to return the item. After the application receives the selection from the associate, the application may send this information to the inventory management system, along an identifier of the item the first customer is returning and a request to remove the item from the virtual shopping cart of the first customer.

In another example, rather than provide image data of the region around the location of the associate, the system may identify the three customers having current locations in the facility corresponding to the region (in this example) and may send respective images of the customers for presentation on the associate computing device. For example, the overhead cameras in the facility may acquire still images (and/or video) of each customer upon entry of the respective customer in the facility. In some instances, when the three customers are later determined to be located within the region around the associate location, the system may send the entry images for presentation on the associate application such that the associate is able to select the first customer that is currently interacting with the associate.

In yet another example, the system may locate the associate, and thus the customers proximate the associate, based on explicit input from an associate. For example, the facility may include multiple scanning devices, each associate with a known location in the facility. When a customer requests to add or remove an item in an interaction with an associate, the associate may locate the nearest scanning device and may scan an identifier associated with the associate. In response, the system may identify the customers located within a predefined distances of the associate and may send any or all of the image data discussed above to the associate computing device to allow the associate to select which customer the associate is currently interacting with. Of course, while the above example describes an imaging device such as a scanning device or camera, it is to be appreciated that the facility may include any other type of device for determining the location of the associate (e.g., a push-button, intercom, etc.). Further, while the above examples describe different methods of identifying the customers, other customer-identification methods may be used, such as asking a customer his or her name and inputting the name into the application, or the like.

Furthermore, while some of the examples below describe adding or removing items to customer's virtual shopping carts using the associate application, in other instances other actions may be taken using the applications. For instance, the associates may modify a price of items, modify a quantity of items in the customer's virtual carts, indicate that an item is free (i.e., given at no cost to the user), or the like.

The facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) (generally denoted as 104) may be held. As used in this disclosure, letters in parenthesis such as "(Q)" indicate an integer result. The items 104 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 106, a storage area 108, and a transition area 110. The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users, such as user 116, and corresponding totes, such as tote 118, and/or other material handling apparatus may move within the facility 102. For example, the users 116 may move about within the facility 102 to pick or place the items 104 in various inventory locations 114, placing them on the totes 118 for ease of transport. An individual tote 118 is configured to carry or otherwise transport one or more items 104. For example, a tote 118 may include a basket, a cart, a bag, and so forth. In other implementations, other agencies such as robots, forklifts, cranes, aerial drones, and so forth, may move about the facility 102 picking, placing, or otherwise moving the items 104. Further, the facility may include one or more associates of the facility (e.g., employees, representatives, volunteers, etc.), such as associate 120. The associates may interact with the users (also referred to as "customers") to help the users locate items in the facility 102, to acquire items for the users (e.g., on shelves that are very high or for users having physical ailments and thus require shopping assistance), to return items from the users prior to exit of the facility 102, or the like.

One or more sensors 122 may be configured to acquire information in the facility 102. The sensors 122 may include, but are not limited to, imaging sensors 122(1), weight sensors, radio frequency (RF) receivers, temperature sensors, humidity sensors, vibration sensors, and so forth. The sensors 122 may be stationary or mobile, relative to the facility 102. For example, the inventory locations 114 may contain imaging sensors 122(1) configured to acquire images of pick or placement of items 104 on shelves, of the users 116 and associates 118 in the facility 102, and so forth. In another example, the floor of the facility 102 may include weight sensors configured to determine a weight of the users 116 or other object thereupon. The sensors 122 are discussed in more detail below with regard to FIG. 8.

During operation of the facility 102, the sensors 122 may be configured to provide information suitable for determining how objects move or other occurrences within the facility 102. For example, a series of images acquired by an imaging sensor 122(1) may indicate removal of an item 104 from a particular inventory location 114 by one of the users 116 and placement of the item 104 on or at least partially within one of the totes 118.

While the storage area 108 is depicted as having one or more aisles 112, inventory locations 114 storing the items 104, sensors 122, and so forth, it is understood that the receiving area 106, the transition area 110, or other areas of the facility 102 may be similarly equipped. Furthermore, the arrangement of the various areas within the facility 102 is depicted functionally rather than schematically. For example, multiple different receiving areas 106, storage areas 108, and transition areas 110 may be interspersed rather than segregated in the facility 102.

The facility 102 may include, or be coupled to, an inventory management system 124. The inventory management system 124 is configured to identify interactions with and between users 116, devices such as sensors 122, robots, material handling equipment, computing devices, and so forth, in one or more of the receiving area 106, the storage area 108, or the transition area 110. These interactions may include one or more events 126. For example, events 126 may include the entry of the user 116 to the facility 102, stocking of items 104 at an inventory location 114, picking of an item 104 from an inventory location 114, returning of an item 104 to an inventory location 114, placement of an item 104 within a tote 118, movement of users 116 relative to one another, gestures by the users 116, and so forth. Other events 126 involving users 116 may include the user 116 providing authentication information in the facility 102, using a computing device at the facility 102 to authenticate identity to the inventory management system 124, interacting with an associate 120 (e.g., to return an item), and so forth. Some events 126 may involve one or more other objects within the facility 102. For example, the event 126 may comprise movement within the facility 102 of an inventory location 114, such as a counter mounted on wheels. Events 126 may involve one or more of the sensors 122. For example, a change in operation of a sensor 122, such as a sensor failure, change in alignment, and so forth, may be designated as an event 126. Continuing the example, movement of an imaging sensor 122(1) resulting in a change in the orientation of the field-of-view 132 (such as resulting from someone or something bumping the imaging sensor 122(1)) may be designated as an event 126. In the illustrated example, the event 126 comprises the user 116 picking a particular item 128 from the inventory location 114. In response to this pick event 126, an item identifier and a corresponding cost of the item may be added to the virtual shopping cart associated with the session identifier that is associated with the customer identifier of the user 116.

By determining the occurrence of one or more of the events 126, the inventory management system 124 may generate output data 130. The output data 130 comprises information about the event 126. For example, where the event 126 comprises an item 104 being removed from an inventory location 114, the output data 130 may comprise an item identifier indicative of the particular item 104 that was removed from the inventory location 114 and a user identifier of a user that removed the item.

The inventory management system 124 may use one or more automated systems to generate the output data 130. For example, an artificial neural network, one or more classifiers, or other automated machine learning techniques may be used to process the sensor data from the one or more sensors 122 to generate output data 130. The automated systems may operate using probabilistic or non-probabilistic techniques. For example, the automated systems may use a Bayesian network. In another example, the automated systems may use support vector machines to generate the output data 130 or the tentative results. The automated systems may generate confidence level data that provides information indicative of the accuracy or confidence that the output data 130 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 116 may pick an item such as a perfume bottle that is generally cubical in shape from the inventory location 114. Other items 104 at nearby inventory locations 114 may be predominately spherical. Based on the difference in shape (cube vs. sphere) from the adjacent items, and the correspondence in shape with the previously stored image of the perfume bottle item, the confidence level that the user 114 has picked up the perfume bottle item is high.

In some situations, the automated techniques may be unable to generate output data 130 with a confidence level above a threshold result. For example, the automated techniques may be unable to distinguish which user 116 in a crowd of users 116 has picked up the item 104 from the inventory location 114. In other situations, it may be desirable to provide human confirmation of the event 126 or of the accuracy of the output data 130. For example, some items 104 may be deemed age restricted such that they are to be handled only by users 116 above a minimum age threshold.

In instances where human confirmation is desired, sensor data associated with an event 126 may be processed to generate inquiry data. The inquiry data may include a subset of the sensor data associated with the event 126. The inquiry data may also include one or more of one or more tentative results as determined by the automated techniques, or supplemental data. The subset of the sensor data may be determined using information about the one or more sensors 122. For example, camera data such as the location of the imaging sensor 122(1) within the facility 102, the orientation of the imaging sensor 122(1), and a field-of-view 132 of the imaging sensor 122(1) may be used to determine if a particular location within the facility 102 is within the field-of-view 132. The subset of the sensor data may include images that may show the inventory location 114 or that the item 104 was stowed. The subset of the sensor data may also omit images from other imaging sensors 122(1) that did not have that inventory location 114 in the field-of-view 132. The field-of-view 132 may comprise a portion of the scene in the facility 102 that the sensor 122 is able to generate sensor data about.

In the example of the user 116 picking the item 128, the subset of the sensor data may comprise a video clip acquired by one or more imaging sensors 122(1) having a field-of-view 132 that includes the item 128. The tentative results may comprise the "best guess" as to which items may have been involved in the event 126. For example, the tentative results may comprise results determined by the automated system that have a confidence level above a minimum threshold.

Furthermore, and as noted above, when a result of an event record is determined to be below a threshold confidence result, prior to sending the sensor data associated with the event 126 to the human associate, the inventory management system 124 may determine whether the record of the event 126 is to be merged with any other event records. If so, the inventory management system 124 may store an indication of the merged event and may send the user interface comprising inquiry data (e.g., a video clip, etc.) associated with the entire merged event to the computing device of the human associate.

In some instances, the user interface may also include supplemental data, such as the weight of the item 128, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 128 being removed from the inventory location 114. One or more of the tentative results associated with the identity of the item 128 may also be presented in the associate user interface. The associate may view the video clip and the supplemental data and make a selection from the tentative results to identify the item 128 was removed from the inventory location 114. The selection or other information generated by the associate comprises response data. The response data from one or more associates may be processed to generate the output data 130. For example, the majority of the associates may identify the item 128 that was picked from the inventory location 114 as "5 oz box powdered toast". Based at least in part on the majority selection, the inventory management system 124 may generate output data 130 indicating that the item 128 picked was "5 oz box powdered toast".

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102. The receiving of the items 104 may comprise one or more events 126 for which the inventory management system 124 may generate output data 130.

Upon being received from a supplier at receiving area 106, the items 104 may be prepared for storage. For example, items 104 may be unpacked or otherwise rearranged. The inventory management system 124 may include one or more software applications executing on a computer system to provide inventory management functions based on the events 126 associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114. Storage of the items 104 and their respective inventory locations 114 may comprise one or more events 126.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, associates 120 of the facility 102 may pick items 104 using written or electronic pick lists derived from customer orders. These picked items 104 may be placed into the tote 118 as the associate (e.g., employee) progresses through the facility 102. Picking may comprise one or more events 126, such as the user 116 in moving to the inventory location 114, retrieval of the item 104 from the inventory location 114, and so forth.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. The transitioning may comprise one or more events 126. Information about the transition may be maintained by the inventory management system 124 using the output data 130 associated with those events 126.

In another example, if the items 104 are departing the facility 102 a list of the items 104 may be obtained and used by the inventory management system 124 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102. The purchase or rental may comprise one or more events 126.

During use of the facility 102, the user 116 may move about the facility 102 to perform various tasks, such as picking or placing the items 104 in the inventory locations 114. Pluralities of users 116 may move past one another, travel in groups, may coalesce into groups, groups may break apart, and so forth. These movements may comprise one or more events 126. For example, an event 126 may comprise a plurality of users 116 moving past one another in the aisle 112.

The inventory management system 124 may access or generate sensor data about the facility 102 and the contents therein including the items 104, the users 116, the totes 118, and so forth. The sensor data may be acquired by one or more of the sensors 122, data provided by other systems, and so forth. For example, the sensors 122 may include imaging sensors 122(1) configured to acquire image data of scenes in the facility 102. The image data may comprise still images, video, or a combination thereof. The image data may be processed by the inventory management system 124 to determine a location of the user 116, the tote 118, the identity of the user 116, and so forth. As used herein, the identity of the user may represent a unique identifier of the user (e.g., name, number associated with user, username, etc.), an identifier that distinguishes the user amongst other users being located with the environment, or the like. The sensors 122 are discussed in more detail below with regard to FIG. 8.

The inventory management system 124, or systems coupled thereto, may be configured to identify the user 116, as well as to determine other candidate users. In one implementation, this determination may comprise comparing sensor data with previously stored identity data. For example, the user 116 may be identified by showing their face to a facial recognition system, by presenting a token carrying authentication credentials, providing a fingerprint, scanning a barcode or other type of unique identifier upon entering the facility, and so forth. Identity of the user 116 may be determined before, during, or after entry to the facility 102. Determination of the user's 116 identity may comprise comparing sensor data associated with the user 116 in the facility 102 to previously stored user data.

In some instances, the inventory management system group users within the facility into respective sessions. That is, the inventory management system 124 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Maintaining sessions in this manner may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 118. Noting the child and the mother as belonging to the same session may increase the chances of successfully adding the box of cereal to the virtual shopping cart of the mother. Stated otherwise, multiple customer identifiers corresponding to multiple customers may each be associated with a single session identifier, to which a virtual shopping cart is associated.

By determining the occurrence of one or more events 126 and the output data 130 associated therewith, the inventory management system 124 is able to provide one or more services to the users 116 of the facility 102. By utilizing one or more human associates to process inquiry data and generate response data that may then be used to produce output data 130, overall accuracy of the system may be enhanced. The enhanced accuracy may improve the user experience of the one or more users 116 of the facility 102.

As described above, in the illustrated event 126 comprises the user 116 picking the item 128 from an inventory location 114 in the facility. In response, the inventory management system 124 may receive the sensor data and, after identifying the event 126, adds an item identifier corresponding to the item 128 to a virtual shopping cart of the user 116. Thereafter, the user 116 decides to return the item 128 prior to exiting the facility 102 and, thus, prior to paying for the item 128. In this example, rather than returning the item 128 to the inventory location 114, the user 116 returns the item 128 to the associate 120, with this return also comprising an event.

As illustrated, the user 116 may have a customer computing device 134 while the associate 120 may have an associate computing device 136. As described above, the associate computing device 136 may execute an associate application that is able to modify users' virtual shopping carts, such as the shopping cart of the user 116. To do so, the associate may input data that identifies the user 116, data that identifies the item(s) 128 being returned (or added to the cart of the user in some instances), a quantity of the item(s), and an action requested, such as return of the item or adding of the item to the user's cart.

In this example, the user 116 requests to return the item 128 and, thus, remove the item identifier corresponding to the item 128 from the virtual shopping cart of the user 112. To identify the customer in this example, an imaging device (e.g., camera, scanner, etc.) of the associate computing device 136 acquires image data of a customer identifier presented on a display of the customer computing device 134. That is, the associate 120 may request that the user 116 present his or her identifier on her device 134 (e.g., the same identifier used to identify the user 116 upon entry to the facility 102) to enable return of the item 128. After the imaging device of the associate computing device 136 acquires the image data, the data may be used to identify the user 116 and, thus, the virtual shopping cart associated with the session of the user 116. For example, the device 136 may send data indicative of the customer identifier to the inventory management system 124 for identifying the customer identifier and, thus, the session identifier and the virtual shopping cart.

Figure 3:
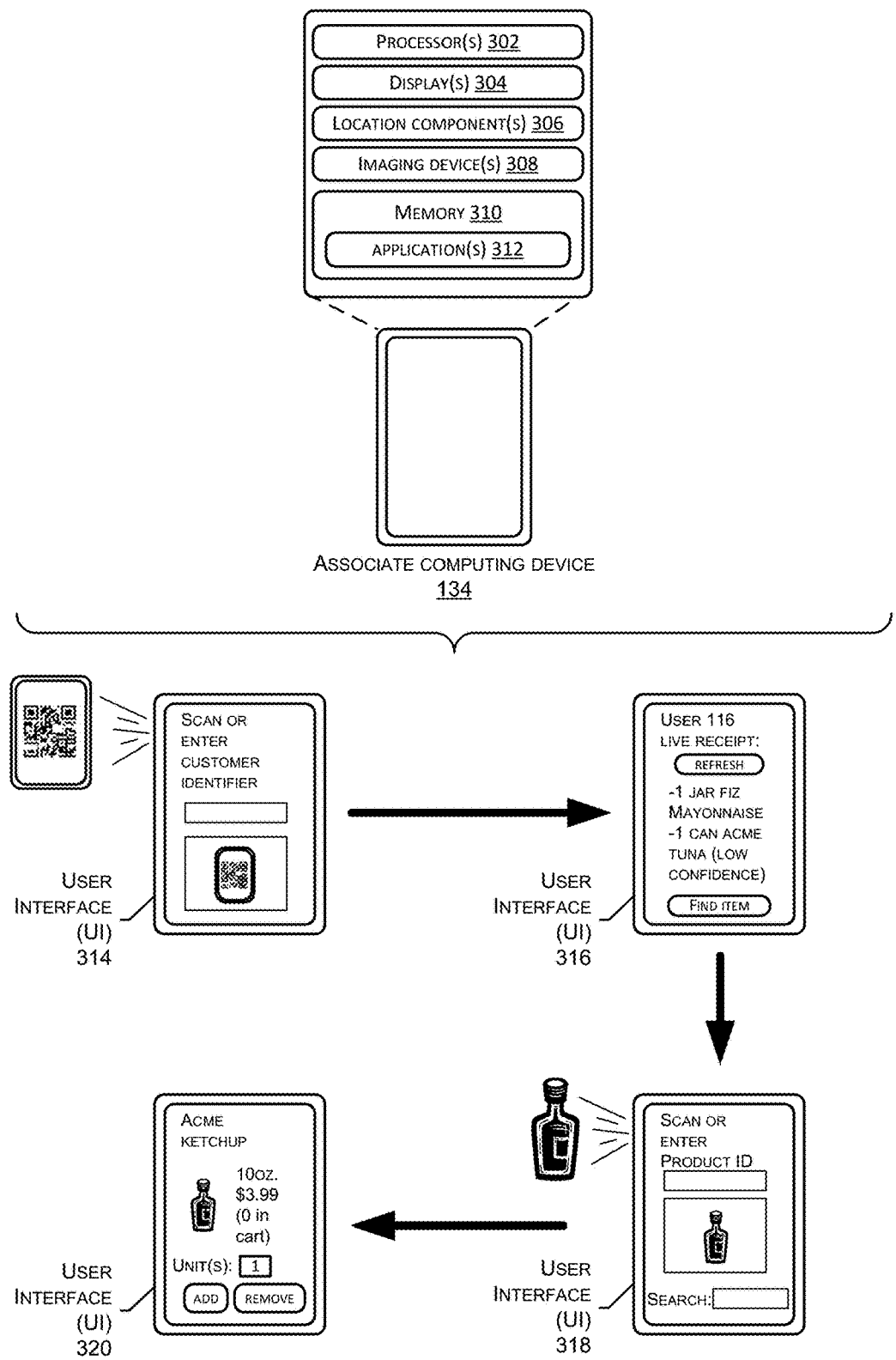
FIG. 3 illustrates example components of an associate computing device, as well as an example user interface (UI) that an associate application may present to allow an associate to identify a user that the associate is currently interacting with and an item associated with the interaction.

In addition, the associate 120 may input an item identifier of the product into the associate application. For example, the associate 120 may utilize the imaging device of the associate computing device 136 to capture an image, barcode, SKU, UPC, etc. of the item 128, may manually input an identifier of the item 128 (e.g., audibly, via a keyboard of the device 136, etc.), or the like. In addition, the associate may input, to the application, an indication of a quantity of the item 128 and an indication that the item 128 is being returned. The device 136 may send this data to the inventory management system 124, which may remove the item identifier corresponding to the item 128 from the virtual shopping cart of the user 116. The associate 120 may then return the physical item 128 to the inventory location 114, if desired. FIGS. 3 and 4B illustrate example user interfaces (UIs) of the associate application and are discussed below.

Figure 2A:
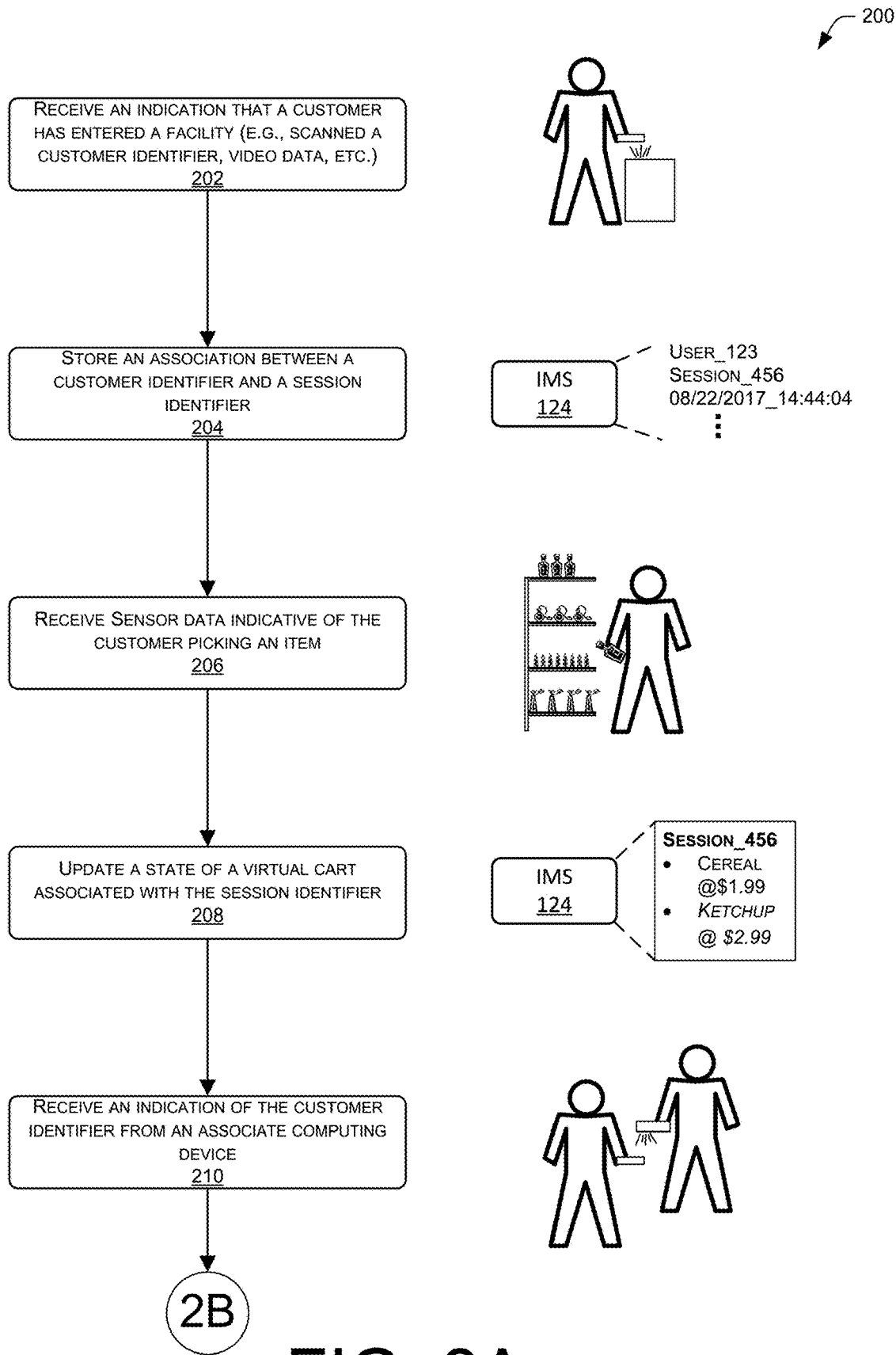
FIGS. 2A-B collectively illustrate a process for adding an item to a virtual shopping cart of a user based on sensor data indicating the user picking the item, as well as removing the item from the virtual shopping cart of the user based on the user returning the item to an associate of the facility.
Figure 2B:
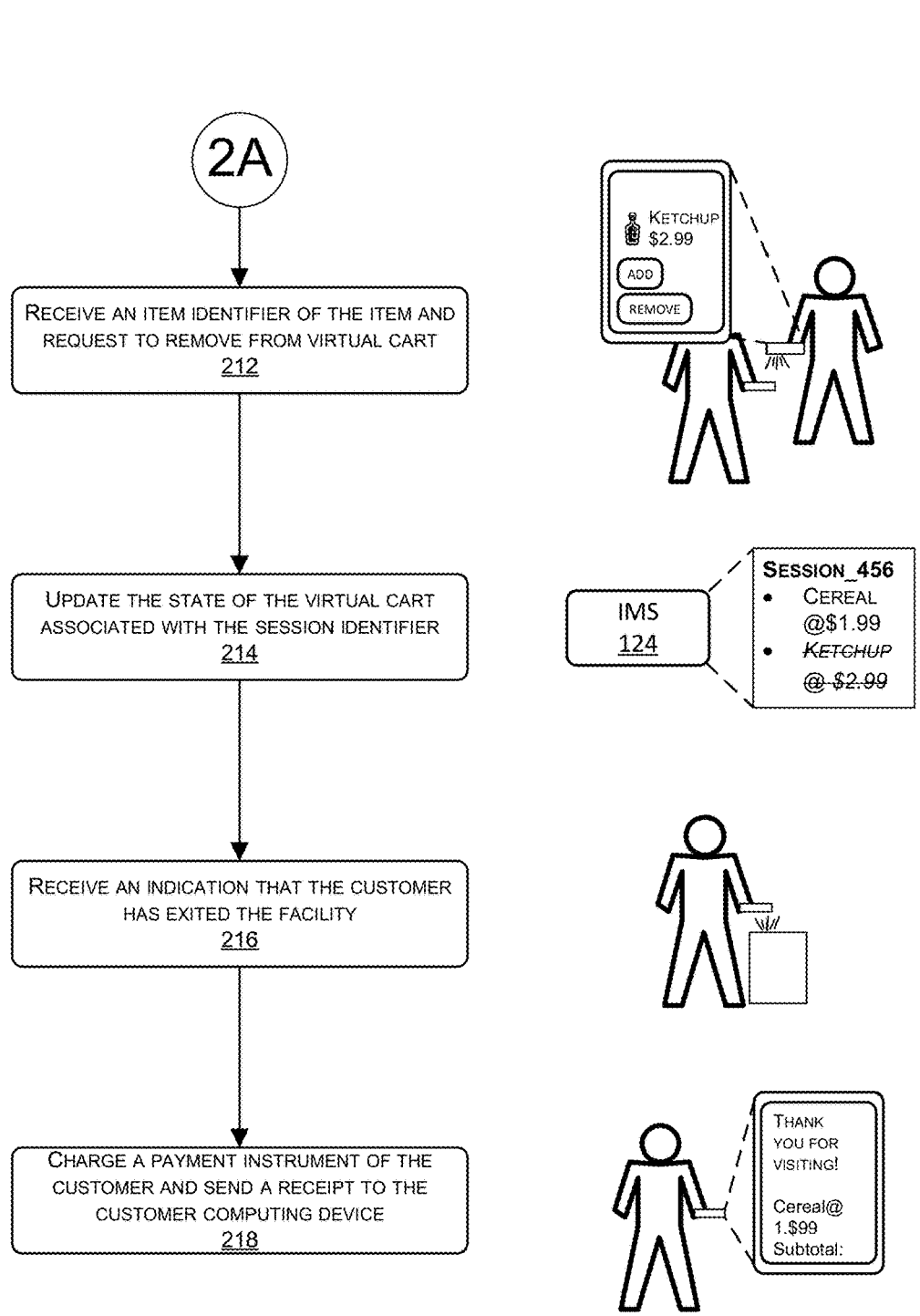

FIGS. 2A-B collectively illustrate a process 200 for adding an item to a virtual shopping cart of a user based on sensor data indicating the user picking the item, as well as removing the item from the virtual shopping cart of the user based on the user returning the item to an associate of the facility. In some instances, the inventory management system 124 may execute some or all of the process 200, potentially receiving information from an associate application, sensors within the facility 102, and the like.

At 202, the inventory management system 124 receives an indication that a customer has entered a facility, such as the example facility 102 of FIG. 1. For example, the customer may scan his or her identifier (e.g., as presented on the customer computing device 134, on a physical substrate, or the like), may be identified using image recognition on image data captured by one or more cameras near the entry of the facility, or the like. In each instance, the inventory management system 124 stores an indication that a customer corresponding to the customer identifier is now in the facility 102.

At 204, the inventory management system 124 stores an association between the customer identifier and a session identifier. As described above, in some instances multiple customers having different customer identifiers enter the facility 102 together (e.g., within a predefined time of one another) and, thus, are each associated with a common session identifier and a single virtual shopping cart. Further, as the customer associated with the customer identifier and session identifier begins navigating the facility 102, the customer may be located using sensors such as overhead cameras and the like.

At 206, the inventory management system 124 receives sensor data indicative of the customer picking an item from a shelf. As described in more detail below, the sensor data may be acquired from weight sensors, RFID-based sensors, overhead cameras, in-shelf cameras, or the like. In response to the user picking the item, at 208 the inventory management system 124 updates a virtual shopping cart associated with the session identifier of the customer. For instance, the cart is updated to indicate an item identifier of the item, a quantity of the item, a cost of the item, and/or the like. That is, as used herein, "updating" the cart includes recording data in the cart, removing data stored in the cart, replacing data stored in the cart, or any other type of modification or addition to the cart. In the illustrated example, the picked item comprises a single bottle of ketchup, which is added to the virtual shopping cart of the customer.

At 210, the inventory management system 124 receives an indication of the customer identifier from an associate computing device operated by an associate within the facility. For example, the associate computing device may have scanned the customer identifier presented on a display of the customer computing device 134, may have selected an image corresponding to the user from a display of the associate computing device, may have entered a name of the customer into the associate computing device, or the like.

FIG. 2B continues the illustration of the process 200 and includes, at 212, the inventory management system 124 receiving an item identifier of an item and a request to remove the item from a virtual shopping cart of the customer. For example, the associate may scan a barcode or other identifier of the item, may capture an image of the item, may manually speak or type in an identifier of the item into the application, or the like. Further, while this example describes the associate computing device 136 requesting to remove an item from the virtual shopping cart of the customer, in other instances the device 136 may issue a request to add an item to the cart or otherwise modify the customer's cart.

At 214, the inventory management system 124 updates the virtual shopping cart of the customer to remove the item identifier received from the associate computing device 136. As illustrated, this includes removing the item identifier, the cost associated with the identifier, and the like.

At 216, the inventory management system 124 receives an indication that the customer associated with the customer identifier has exited the facility 102. For example, the customer may have scanned his or her customer identifier on the scanning device proximate the entry (and exit) of the facility, may have been identified as leaving via image data acquired by one or more overhead cameras, and/or the like. At 218, the inventory management system 124 may charge a payment instrument previously stored on file in association with the customer identifier of the customer for a cost of the items represented in the virtual shopping cart at the time of exit of the customer. In addition, a receipt may be generated and sent to the customer computing device of the customer.

FIG. 3 illustrates example components of an associate computing device 136, as well as an example user interface (UI) that an associate application may present to allow an associate 120 to identify a customer that the associate is currently interacting with and an item associated with the interaction. As illustrated, the associate computing device may include one or more processors 302, one or more displays 304, one or more location components 306, one or more imaging devices 308, and memory 310, which may store one or more applications, such as the associate application for updating users' virtual shopping carts.

In some instances, the display 304 may present information to allow the associate 120 to input data for identifying customers, items, quantities, and requests (e.g., add items to cart, remove items from cart, etc.). The location component 306, meanwhile, may be used to provide location information (e.g., GPS coordinates) to the inventory management system 124 for use in determining a location of the associate 120 and, thus, customers proximate to the associate 120. The imaging device 308, meanwhile, may be used to scan or otherwise capture image data associated with customer identifiers, such as barcodes, QR codes, alphanumeric strings, and the like that the customers may use to identify themselves when entering and exiting the facility as well as within the facility 102.

For instance, FIG. 3 illustrates that the associate application may present a UI 314 that allows the associate 120 to enter an identifier of a customer. For instance, the UI 314 requests that the associate scan or enter a customer identifier, and includes a text box for typing in or audibly stating a customer identifier (e.g., name, alphanumeric string, etc.) as well as a window that utilize an imaging device to capture image data of the customer identifier. In this example, for instance, the imaging device 308 of the associate computing device 136 scans a QR code or other identifier presented on a display of a customer computing device.

In some instances, after identifying the customer (or session), the associate computing device 134 may present a UI 316 that depicts current cart contents associated with the session of the customer. This may include an indication of current items the virtual cart of the customer, images of the items, individual prices of the items, a quantity of the items, a current total price of the virtual cart, a past shopping history of the user, or the like. In addition, the UI 316 may include an icon that allows the associate to request to "refresh" the UI 316 to ensure that the UI 316 is presenting the most up-to-date version of the virtual cart of the customer. The UI 316 may also include an icon (e.g., entitled "Find Item") that, when selected, results in the associate computing device 134 presenting a UI for enabling the associate to search for and/or locate a particular item of interest to a customer within the inventory of the facility. For example, in the instant example the customer may desire to return a bottle of ketchup to the associate such that the ketchup is removed from or added to the cart of the customer.

In response to the associate selecting the icon to "Find [an] item", the associate application may present a UI 318 that allows the associate 120 to enter an item identifier associated with an item being added to a cart, removed from a cart, or the like. For example, the UI 318 includes a text box as well as a window that utilizes the imaging device 308 to scan or otherwise capture image data for identifying the item identifier. Alternatively, the UI 318 may include a text box where the associate may use keywords to search for an item in inventory of the facility. In the illustrated example, the associate 120 uses the imaging device to scan a barcode or otherwise capture image data for identifying the item, in this example the bottle of ketchup.

After scanning or otherwise identifying the item, the associate computing device 134 may present a UI 320. The UI 320 may include details about the item, such as brand name, item name, size, price, a number of units currently in the user's cart, and/or the like. In addition, the UI 320 may include an icon that, when selected, results in a request to the inventory management system 124 to add an item identifier corresponding to the identified item to the virtual shopping cart of the customer, as well as an item that, when selected, results in a request to remove an item from the virtual shopping cart. The UI 320 may further include a drop-down menu, text box, or other mechanism to allow the associate to specify a quantity of the item to add or remove to or from the cart of the user.

Figure 4A:
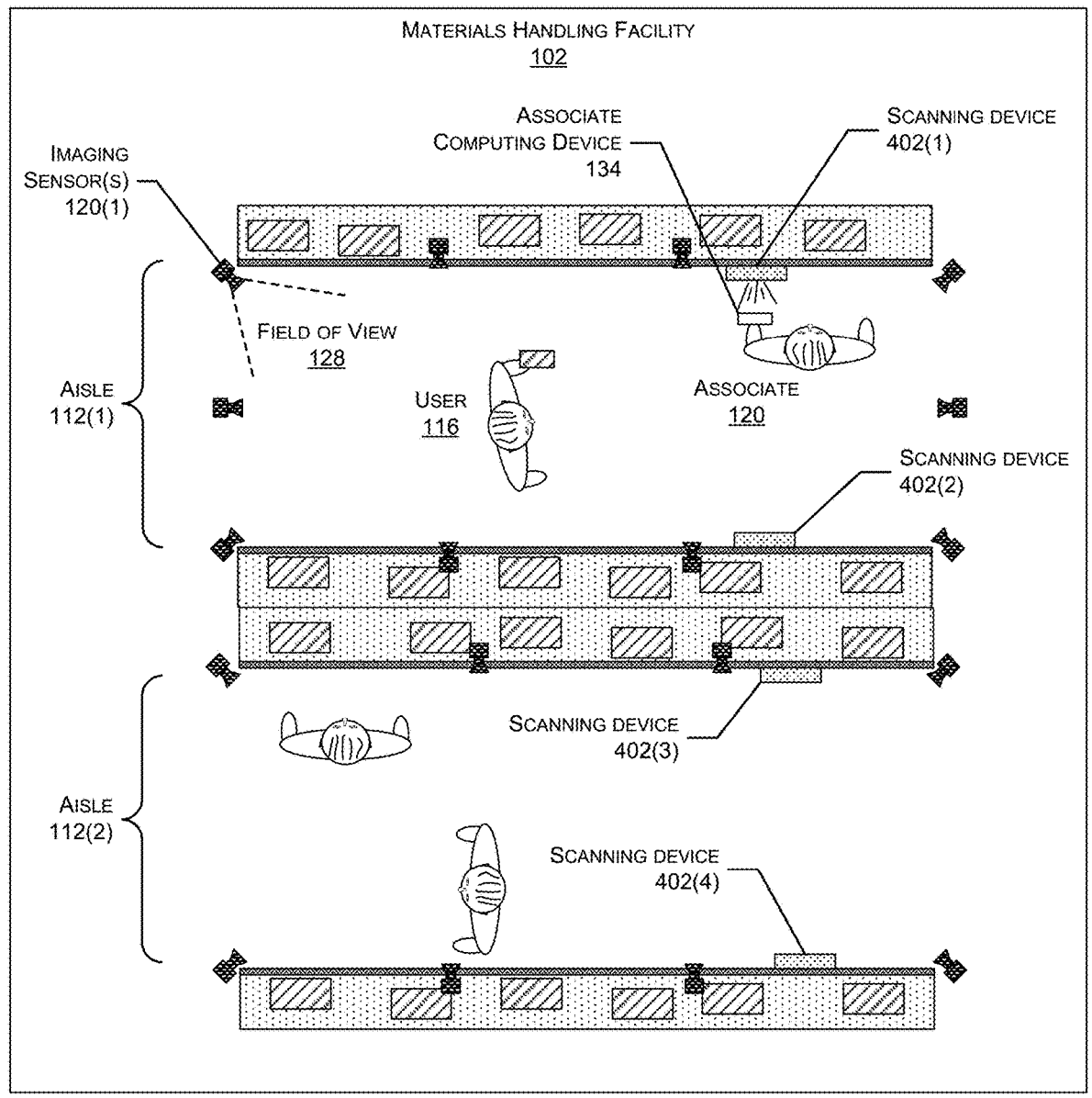
Figure 4B:
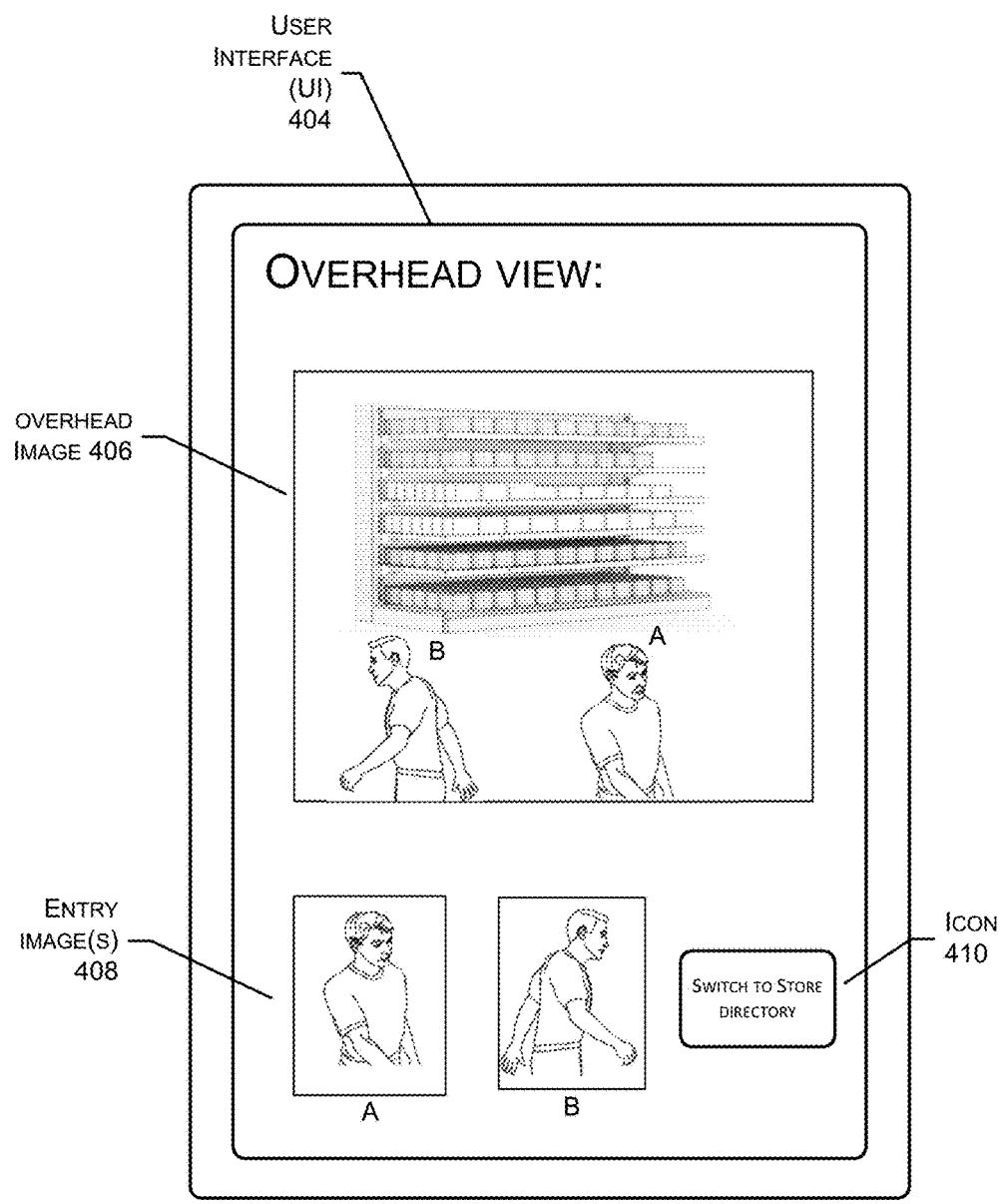

FIG. 4A illustrates an example of the materials handling facility 102 that includes multiple scanning devices 402(1), 402(2), 402(3), and 402(4) that each associate 120 of the facility may use to provide the system with a current location of the respective associate. This location data, in turn, may be used to help determine users that are proximate the associate and thus allow the associate 120 to identify the user that he or she is currently interacting with. In this example, for instance, envision that the user 116 approaches the associate 120 and requests that the associate 120 assist the user 116 in some manner, such as remove an item from the virtual shopping cart of the user, pick an item on behalf of the user, or the like. To do so, the associate 120 may need to first identify the customer in order to operate on his or her cart. Therefore, the associate may utilize the nearest scanning device, in this instance scanning device 402(1), and may scan an associate identifier of the associate 120, such as a barcode, QR code, or the like.

In another example, the associate may utilize the nearest scanning device, such as scanning device 402(1), to indicate a current location of the associate in another manner. For example, the associate may pick an item from a shelf adjacent to the scanning device 402(1) and may scan the item. In turn, the system may map the known location of the shelf on which the item sits to location coordinates (e.g., aisle, 3D coordinates, etc.) within the facility. Further, while the above example describes scanning an item identifier via the scanning device 402(1), in other instances the associate may scan the item using a scanning device (e.g., scanner, camera, etc.) of the associate computing device 136. The associate computing device 136 may then provide information indicative of this item to the inventory management system 124. The inventory management system 124 may then map the item identifier to a known location of the scanned item, and may use this location as a current location estimate of the associate.

In each of the above instances, the inventory management system 124 may use the estimated location of the associate to determine a region-of-interest around the location of the associate 120, and may send image data to assist the associate 120 in identifying the user 116 that the associate is interacting with. For example, the inventory management system 124 may identify one or more cameras having respective fields-of-view that includes at least a portion of the region around the location of the associate 120 and sends this image data for presentation on the display of the associate computing device. The associate 120 may then select which customer in the image data corresponds to the user 116. In another example, the inventory management system 124 may instead query a location service of the system 124 to identify which customers are currently located in the region-of-interest, may retrieve entry images of these customers entering the facility 102 (or other images of the users) and may send these images to the associate computing device, as discussed below with reference to FIG. 4B.

Figure 4C:
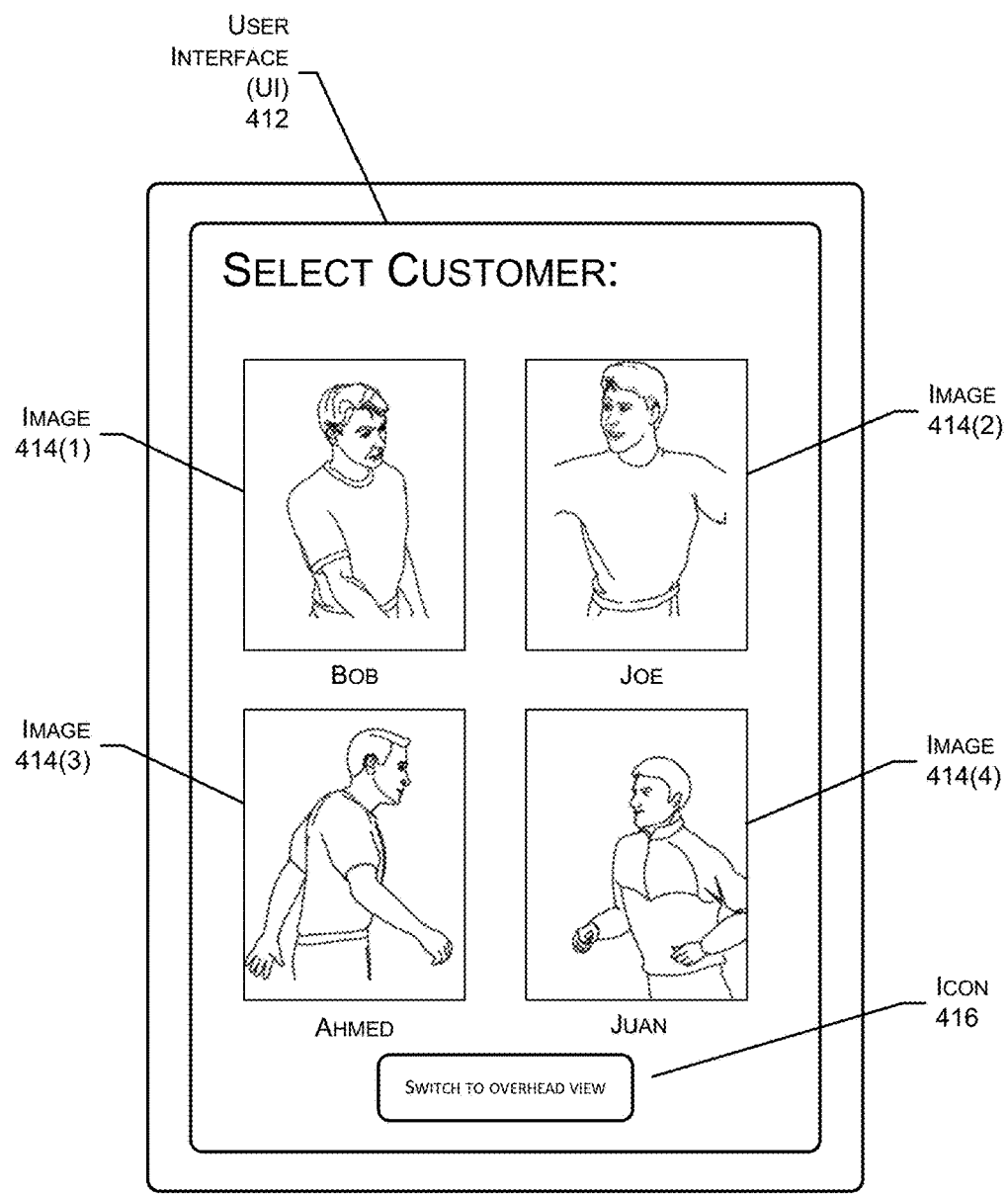

FIGS. 4B-C respectively illustrate example UIs 404 and 406 that the associate application may present in response to the associate 120 scanning his or her identifier at the scanning device 402(1) of FIG. 4A, in response to the associate scanning a particular item on a shelf, or in response to the associate 120 indicating his or her location in the facility in any other manner. In response to the associate scanning his or her identifier, the system may identify the location of the associate (or a proxy of the location, such as a location of the scanning device 402(1), a location of a shelf on which a particular item scanned by the associate sits, or the like). After identifying the location, the system may identify one or more camera(s) in the facility 102 having a field-of-view of the associate and may sending video or one or more still images acquired by these camera(s) to the associate computing device. The associate computing device 136 may present this image data, as shown in the UI 404.

As illustrated, the UI 404 includes overhead image data 406 corresponding to the still images or video corresponding to the location of the associate. The UI 404 may also include, overlaid the overhead image data 406, a respective symbol or identifier associated with each respective customer in the image data 406. For instance, each user identified in the image may include an identifier (e.g., A, B, etc.) to identify the customer in the image data 406. In addition, the system may retrieve entry images 408 corresponding to the users in the overhead image data 408 along with the same respective symbol or identifier. Therefore, the associate may select which customer he or she is interacting with by selecting the entry image on the display, entering the symbol or identifier into a text box, or the like. In still other instances, the UI 404 may include an icon 410 that, when selected, causes the associate computing device 136 to "switch to a store directory" that shows an entry image of each customer currently in the facility. If, for instance, the associate is unable to locate, via the UI 404, the customer the associate is currently interacting with, then the associate may choose to "fall back" to use of the store directory view.

FIG. 4C illustrates an example UI 412 corresponding to the store directory view. In this example, the system 124 identifies four users that are currently located within the facility (and, potentially within a region-of-interest, that is, within a threshold distance of the location of the associate 120) and sends images 414(1), 414(2), 414(3), and 414(4) of these four users to the associate computing device 136. The associate 120 may then compare the images 414(1)-(4) to the user 116 currently in front of the associate 120. The associate 120 may then select the appropriate image (e.g., via a touchscreen, mouse, manual input, etc.). In some instances, the UI 412 may present additional information in helping the associate identify the customer, such as a first name or nickname of the respective customers. Here, for example, the UI 412 indicates the four names Bob, Joe, Ahmed, and Juan associated with the respective customers. Therefore, the associate may interact with the user 116 to help the associate select the correct image. For example, the associate may ask a question such as, "you are Joe, correct?" In some instances, users, such as the user 116 may provide a name when registering with the facility. Therefore, each unique customer key that respective users scan upon entry or exit of the facility may be associated with a name of the user, thereby allowing this user to be retrieved and presented as part of the UI 412. Further, while the UI 412 describes presenting images and/or names of the users, in other instances additional or alternative information may be displayed for the purpose of assisting the associate in identifying the customer (e.g., gender, age, height, etc.).

In still other instances, in addition to the UIs described above, in response to the associate scanning his or her identifier, the system may identify those users that within a defined region of the location of the associate 120, may retrieve images of these users (e.g., as captured upon the respective user's entry into the facility), and may send these images to the associate application. The associate may then select the image of the user he or she is currently interacting with. Further, while a few examples have been described, it is to be appreciated that the customer that a particular associate is interacting with may be identified in any other suitable manner. For example, the associate may request to capture an image of a face of the user 116 using the associate computing device 136. The image may then be sent to the inventory management system 124 for identifying the user 116 using facial-recognition techniques or allowing human users to identify the customer. Further, in some instances the associates may wear a body camera or the like, which may be used for capturing the images for use in identifying the customers interacting with the respective associate. Further, in some instances other biometric characteristics of the customers may be determined using the associate computing device 136, the scanning devices 402, or the like for use in identifying the customers.

Figure 5:
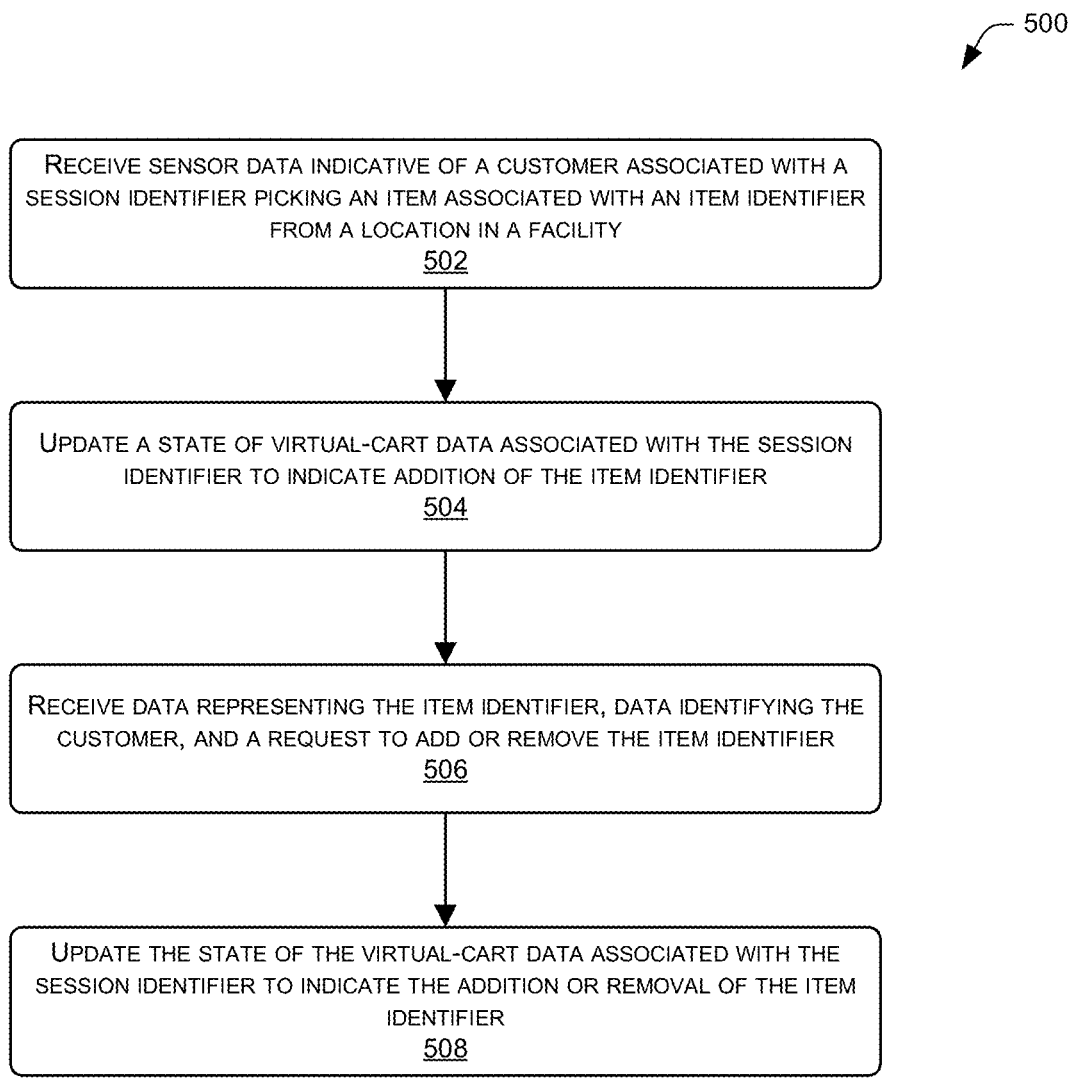
FIG. 5 illustrates a flow diagram of an example process for utilizing an associate application to update a virtual shopping cart of a customer within an environment, such as the materials handling facility of FIG. 1.

FIG. 5 illustrates a flow diagram of an example process 500 for utilizing an associate application to update a virtual shopping cart of a customer within an environment, such as the materials handling facility of FIG. 1. In some instances, this and other processes described herein may be performed by the inventory management system 124, potentially in combination with other devices and systems.

At 502, the inventory management system 124 receives sensor data indicative of a customer picking an item from a location in a facility, with the item being associated with an item identifier and the customer associated with a session identifier. As described above, the inventory management system 124 may identify the customer picking the event based on one or more sensors within the facility.

At 504, the inventory management system 124 updates a virtual-cart data associated with the session identifier to indicate addition of the item identifier. For instance, the system 124 may update the cart data to indicate the added item, the cost of the added item, and/or other details of the item and/or details of the event (e.g., time of the pick event, etc.).

At 506, the inventory management system 124 receives, from an associate computing device, data representing the item identifier, data identifying the customer associated with the session identifier, and a request to update the virtual-cart data associated with the session identifier to indicate removal of the item identifier. The data identifying the customer may be based on the associate computing device capturing image data of the customer identifier, the associate application having received a selection of an image of the customer, the associate application having received a manual input of a customer identifier, or the like. The data identifying the item, meanwhile, may comprise data indicating that a barcode of the item has been scanned, image data of the item has bene captured, manual data having been entered into the application or the like.

At 508, and in response to operation 506, the inventory management system 124 updates the virtual-cart data associated with the session identifier to indicate the removal of the item identifier. For instance, the system 124 may remove the item data, cost data, and the like from the virtual-cart data.

Figure 6:
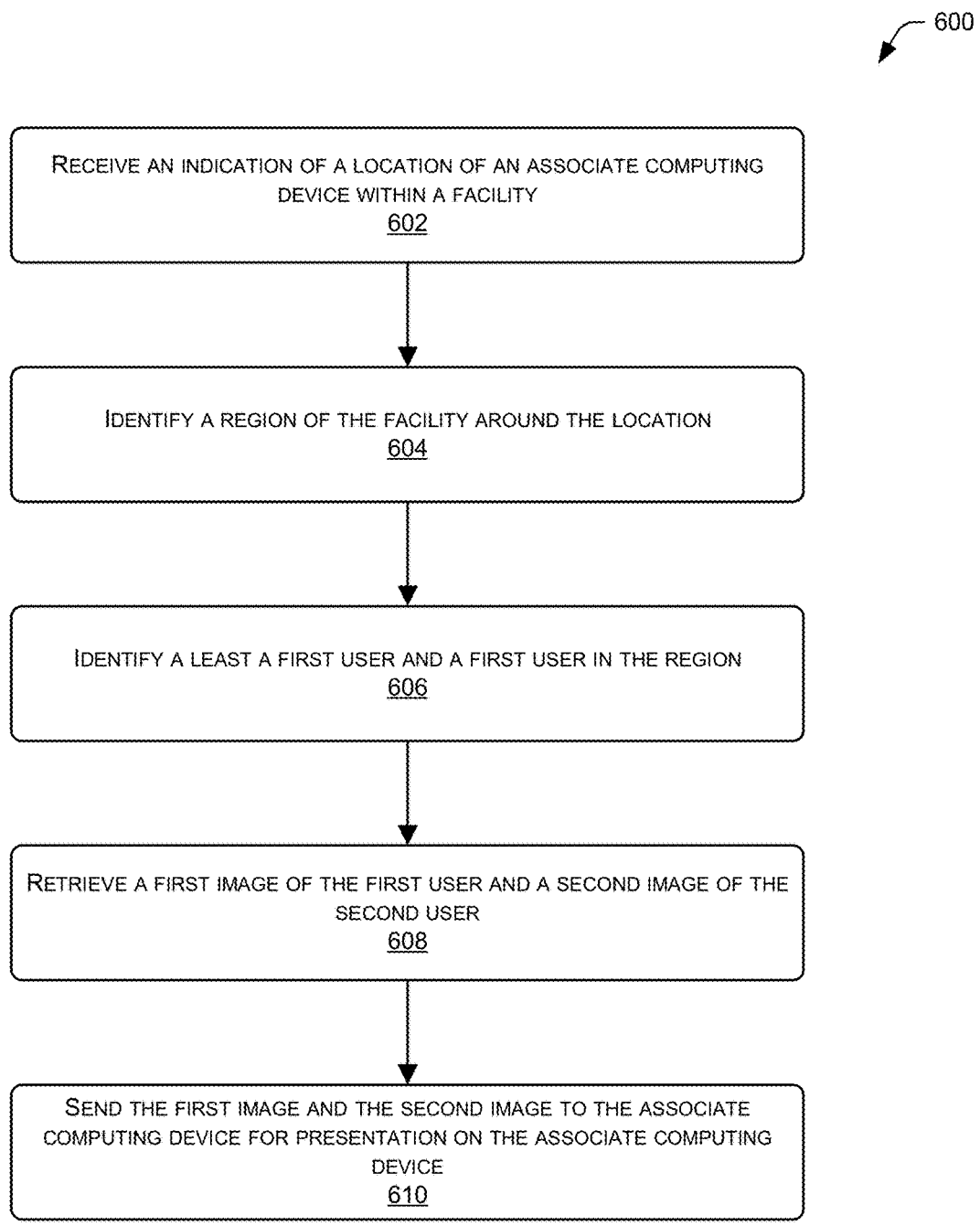

FIG. 6 illustrates a flow diagram of an example process 600 for enabling an associate to identify a customer that he or she is currently interacting with. At 602, the inventory management system 124 receives an indication of a location of the associate computing device within the facility. For example, the system 124 may receive location (e.g., GPS) coordinates from the device, may receive an indication that the associate identifier has been scanned at a scanning device at a known location in the facility, may identify the location of the associate computing device based on image recognition of the associate and/or the device within image data of the facility 102, or the like.

At 604, the inventory management system 124 identifies a region of the facility around the location of the associate computing device 136. For example, the system 124 may determine a predefined radius around the location of the device (e.g., 10 feet, 50 feet, etc.) and, at 606, may identify at least a first user and a second user currently located within region. For instance, the system 124 may query a location service to identify users that are currently associated with locations in the facility that is within the determined region. In response to identifying the first and second users, the system 124 may retrieve a first image of the first user and a second image of the second user. In some instances, these images may comprise images of the users captured upon entry of the facility, pre-stored profile images of the users, or the like. Finally, at 610, the system 124 sends the images to the associate computing device to enable the associate 120 to select the appropriate image.

Figure 7:
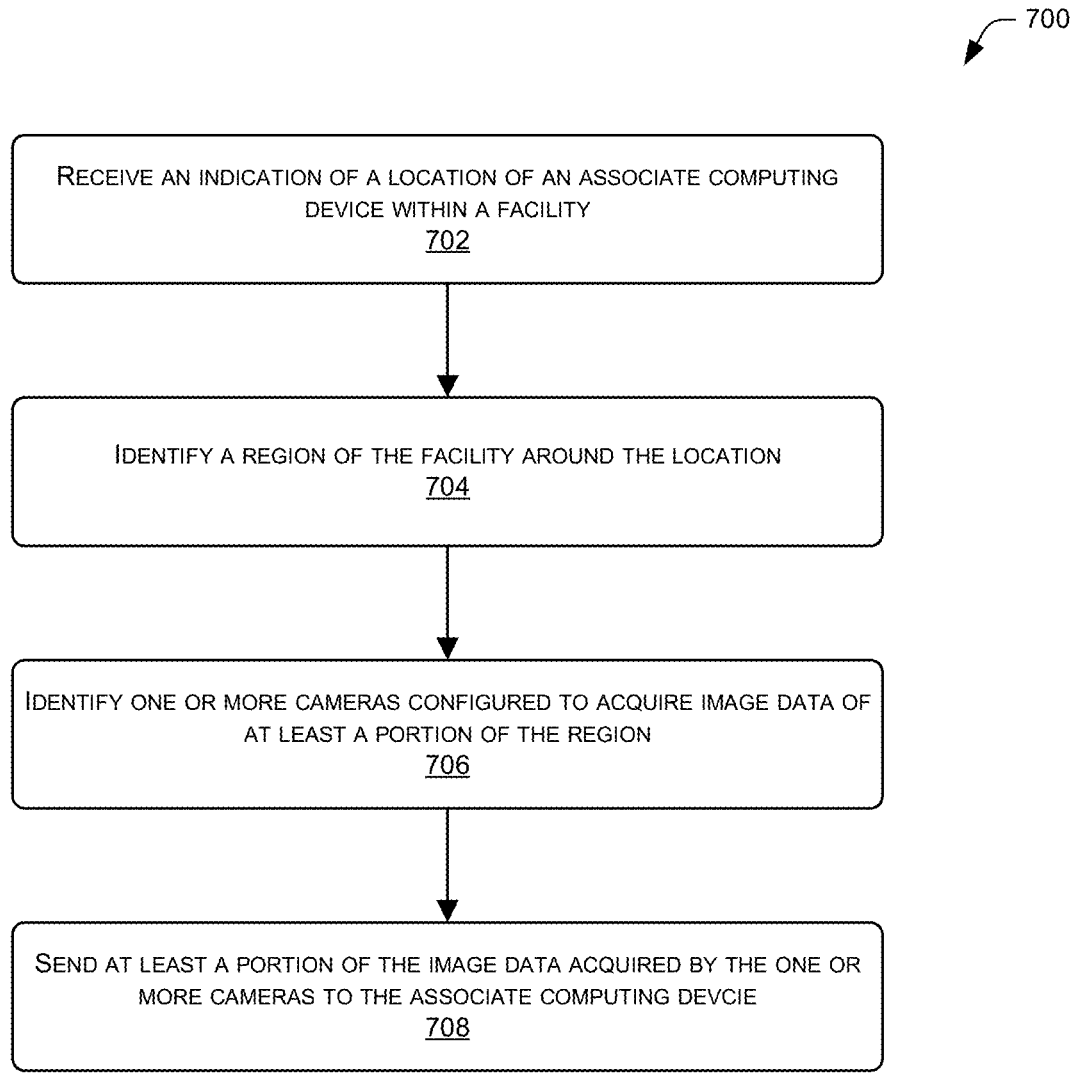

FIG. 7 illustrates a flow diagram of another example process 700 for enabling an associate to identify a customer that he or she is currently interacting with. At 702, the inventory management system 124 receives an indication of a location of the associate computing device within the facility. For example, the system 124 may receive location (e.g., GPS) coordinates from the device, may receive an indication that the associate identifier has been scanned at a scanning device at a known location in the facility, may identify the location of the associate computing device based on image recognition of the associate and/or the device within image data of the facility 102, or the like.

At 704, the inventory management system 124 identifies a region of the facility around the location of the associate computing device 136. For example, the system 124 may determine a predefined radius around the location of the device (e.g., 10 feet, 50 feet, etc.) and, at 706, identifies one or more cameras in the facility 102 each configured to acquire image data of at least a portion of the region. At 708, the inventory management system 124 sends at least a portion of the image data to the associate computing device to allow the associate 120 to select the appropriate customer represented in the image data (i.e., the customer corresponding to whom the associate is currently interacting with).

Figure 8:
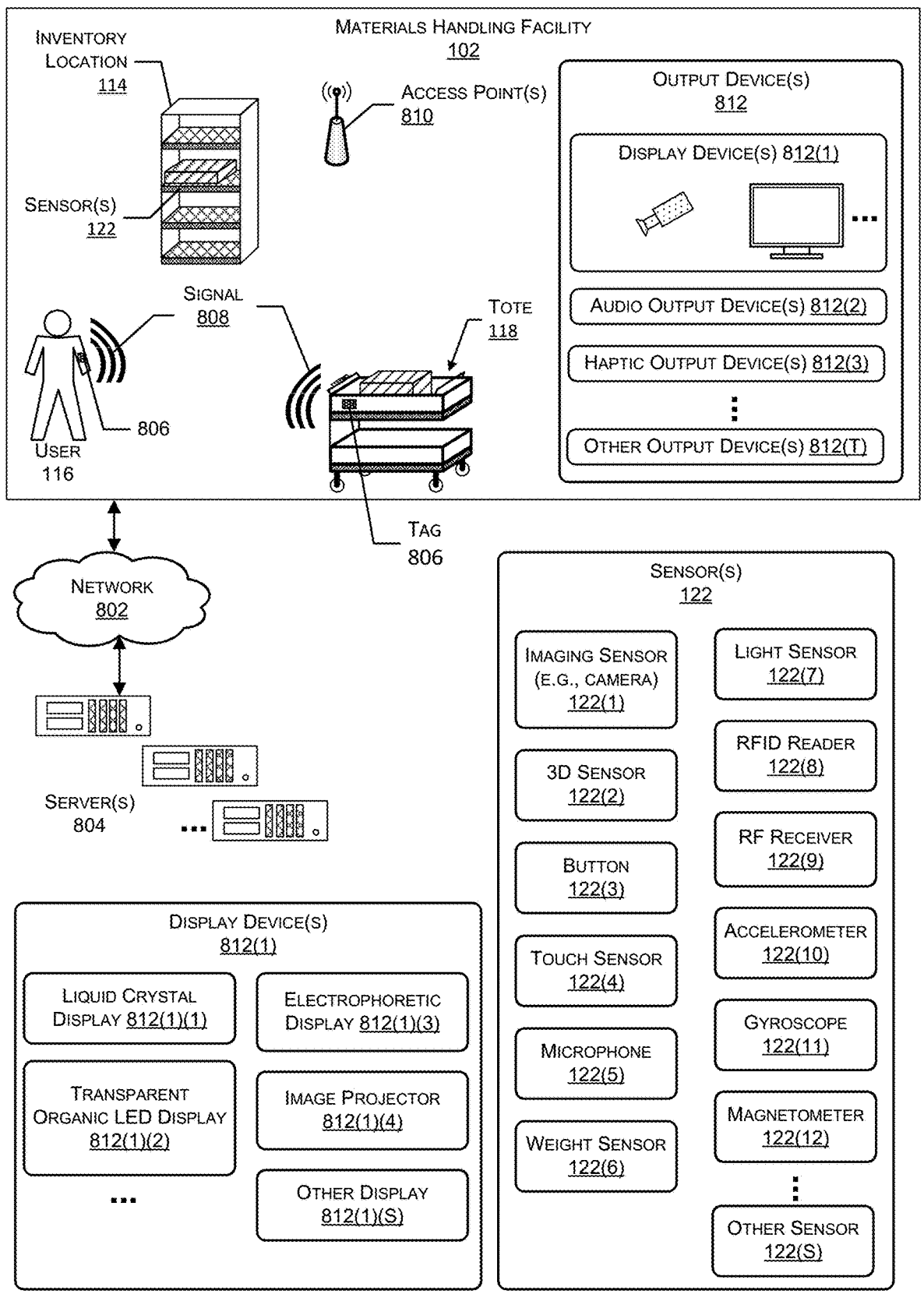
FIG. 8 is a block diagram illustrating additional details of the facility, including example sensors that may facilitate maintaining accurate states of virtual shopping carts of users within the facility.

FIG. 8 is a block diagram 800 illustrating additional details of the facility 102, according to some implementations. The facility 102 may be connected to one or more networks 802, which in turn connect to one or more servers 804. The network 802 may include private networks such as an institutional or personal intranet, public networks such as the Internet, or a combination thereof. The network 802 may utilize wired technologies (e.g., wires, fiber optic cable, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite), or other connection technologies.

The servers 804 may be configured to execute one or more modules or software applications associated with the inventory management system 124. While the servers 804 are illustrated as being in a location outside of the facility 102, in other implementations, at least a portion of the servers 804 may be located at the facility 102. The servers 804 are discussed in more detail below with regard to FIG. 9.

The users 116, the totes 118, or other objects in the facility 102 may be equipped with one or more tags 806, such as radio frequency (RF) tags. The tags 806 may be configured to emit a signal 808. In one implementation, the tag 806 may be a radio frequency identification (RFID) tag configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence. For example, an acoustic tag 806 may be configured to generate an ultrasonic signal which is detected by corresponding acoustic receivers. In yet another implementation, the tag 806 may be configured to emit an optical signal.

The inventory management system 124 may be configured to use the tags 806 for one or more of identification of the object, determining a location of the object, and so forth. For example, the users 116 may wear tags 806, the totes 118 may have tags 806 affixed, and so forth, which may be read and, based at least in part on signal strength, used to determine identity and location. Generally, the inventory management system 124 or other systems associated with the facility 102 may include any number and combination of input components, output components, and servers 804.

The one or more sensors 122 may be arranged at one or more locations within the facility 102. For example, the sensors 122 may be mounted on or within a floor, wall, at a ceiling, at an inventory location 114, on the tote 118, may be carried or worn by the user 116, and so forth. The sensors 122 produce respective sensor data.

The sensors 122 may include one or more imaging sensors 122(1). These imaging sensors 122(1) may include cameras configured to acquire images of a scene. The imaging sensors 122(1) are configured to detect light in one or more wavelengths including, but not limited to, terahertz, infrared, visible, ultraviolet, and so forth. The imaging sensors 122(1), as well as any image sensors described herein, may provide sensor data in the form of the image data, in the form of indications of what item was picked or return and the location of the item, combinations thereof, and/or the like. The inventory management system 124 may use image data acquired by the imaging sensors 122(1) during operation of the facility 102. For example, the inventory management system 124 may identify items 104, identify users 116, identify totes 118, determine a location, and so forth, based at least in part on their appearance within the image data.

One or more three-dimensional (3D) sensors 122(2) may also be included in the sensors 122. The 3D sensors 122(2) are configured to acquire spatial or 3D data, such as depth information, about objects within a sensor field-of-view. The 3D sensors 122(2) include range cameras, lidar systems, sonar systems, radar systems, structured light systems, stereo vision systems, optical interferometry systems, and so forth. The inventory management system 124 may use the 3D data acquired to identify objects, determine a location of an object, and so forth. For example, the inventory management system 124 may determine operational data such as location in the facility 102 of the user 116 based at least in part on the location in 3D space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 124 may use data from the buttons 120(3) to receive information from the user 116 and produce button data.

The sensors 122 may include one or more touch sensors 122(4). The touch sensors 122(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 124 may use data from the touch sensors 122(4) to receive information from the user 116. For example, the touch sensor 122(4) may be integrated with the tote 118 to provide a touchscreen with which the user 116 may select from a menu one or more particular items 104 for picking.

One or more microphones 120(5) may be configured to acquire information indicative of sound present in the environment and generate audio data. In some implementations, arrays of microphones 120(5) may be used. These arrays may implement beamforming techniques to provide for directionality of gain. The inventory management system 124 may use the one or more microphones 120(5) to acquire information from acoustic tags, accept voice input from the users 116, determine the location of one or more users 116 in the facility 102, determine ambient noise level, and so forth.

One or more weight sensors 122(6) are configured to measure the weight of a load, such as the item 104, the user 116, the tote 118, and so forth and generate weight data. The weight sensors 122(6) may be configured to measure the weight of the load at one or more of the inventory locations 114, the tote 118, or on the floor of the facility 102. The weight sensors 122(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 124 may use the data acquired by the weight sensors 122(6) to identify an object, determine a location of an object, maintain shipping records, identify the user 116, and so forth. In addition to the weight data, the weight sensors 122(6) may send an indication of an item picked or returned and a location of the item, an indication of a cost of an item removed, combinations there, and/or the like. Further, each of the sensors 122 may provide this type of data.

The sensors 122 may include one or more light sensors 122(7) configured to generate light sensor data. The light sensors 122(7) may be configured to provide information associated with ambient lighting conditions such as a level of illumination. Information acquired by the light sensors 122(7) may be used by the inventory management system 124 to adjust a level, intensity, or configuration of the user interface.

One more radio frequency identification (RFID) readers 120(8), near field communication (NFC) systems, and so forth, may also be provided in the sensors 122. For example, the RFID readers 120(8) may be configured to read the tags 806 and generate RFID tag data. Information acquired by the RFID reader 120(8) may be used by the inventory management system 124 to identify an object associated with the tag 806 such as the item 104, the user 116, the tote 118, and so forth. For example, based on information from the RFID readers 120(8), a velocity of the tag 806 may be determined.

One or more RF receivers 120(9) may also be provided in the sensors 122 to generate radio-frequency data. In some implementations, the RF receivers 120(9) may be part of transceiver assemblies. The RF receivers 120(9) may be configured to acquire RF signals 208 associated with Wi-Fi™, Bluetooth®, ZigBee®, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 124 to determine a location of an RF source, such as a communication interface onboard the tote 118 or carried by the user 116.

The sensors 122 may include one or more accelerometers 120(10) that may be worn or carried by the user 116, mounted to the tote 118, and so forth. The accelerometers 120(10) may provide accelerometer data such as the direction and magnitude of an imposed acceleration. Data such as rate of acceleration, determination of changes in direction, speed, and so forth, may be determined using the accelerometers 120(10).

A gyroscope 120(11) provides gyroscope data indicative of rotation of an object affixed thereto. For example, the tote 118, the user 116, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may generate magnetometer data indicative of the direction, strength, and so forth of a magnetic field. The magnetometer 120(12) may be worn or carried by the user 116, mounted to the tote 118, and so forth. For example, the magnetometer 120(12) mounted to the tote 118 may act as a compass and provide information indicative of which way the tote 118 is oriented.

The sensors 122 may include other sensors 122(S) as well. For example, the other sensors 122(S) may include proximity sensors, ultrasonic rangefinders, thermometers, barometric sensors, hygrometers, biometric input devices including, but not limited to, fingerprint readers or palm scanners, and so forth. For example, the inventory management system 124 may use information acquired from thermometers and hygrometers in the facility 102 to direct the user 116 to check on delicate items 104 stored in a particular inventory location 114.

The facility 102 may include one or more access points 810 configured to establish one or more wireless networks and the network 202. The access points 810 may use Wi-Fi™, NFC, Bluetooth®, or other technologies to establish wireless communications between a device and the network 202. The wireless networks allow the devices to communicate with one or more of the inventory management system 124, the sensors 122, the tag 806, a communication device of the tote 118, or other devices.

Output devices 812 may also be provided in the facility 102. The output devices 812 are configured to generate signals which may be perceived by the user 116. The output devices 812 may include display devices 812(1), audio output devices 812(2), haptic output devices 812(3), or other output devices 812(T).

The display devices 812(1) may be configured to provide output which may be seen by the user 116 or detected by a light-sensitive detector such as an imaging sensor 122(1) or light sensor 122(7). The output may be monochrome or color. The display devices 812(1) may be emissive, reflective, or both. An emissive display device 812(1) is configured to emit light during operation. For example, a light emitting diode (LED) is an emissive visual display device 812(1). In comparison, a reflective display device 812(1) relies on ambient light to present an image. For example, an electrophoretic display 812(1)(3) is a reflective display device 812(1). Backlights or front lights may be used to illuminate the reflective visual display device 812(1) to provide visibility of the information in conditions where the ambient light levels are low.

Mechanisms of the display devices 812(1) may include liquid crystal displays 812(1)(1), transparent organic LED displays 812(1)(2), electrophoretic displays 812(1)(3), image projectors 812(1)(4), or other displays 812(1)(S). The other displays 812(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 812(1) may be configured to present images. For example, the display devices 812(1) may comprise a pixel-addressable display. The image may comprise at least a two-dimensional array of pixels or a vector representation of an at least two-dimensional image.

In some implementations, the display devices 812(1) may be configured to provide non-image data, such as text characters, colors, and so forth. For example, a segmented electrophoretic display 812(1)(3), segmented LED, and so forth, may be used to present information such as a stock keeping unit (SKU) number. The display devices 812(1) may also be configurable to vary the color of the text, such as using multicolor LED segments.

In some implementations, display devices 812(1) may be configurable to provide image or non-image output. For example, an electrophoretic display 812(1)(3) with addressable pixels may be used to present images of text information, or all of the pixels may be set to a solid color to provide a colored panel.

One or more audio output devices 812(2) are configured to provide acoustic output. The acoustic output includes one or more of infrasonic sound, audible sound, or ultrasonic sound. The audio output devices 812(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 812(3) are configured to provide a signal which results in a tactile sensation to the user 116. The haptic output devices 812(3) may use one or more mechanisms such as electrical stimulation or mechanical displacement to provide the signal. For example, the haptic output devices 812(3) may be configured to generate a modulated electrical signal, which produces an apparent tactile sensation in one or more fingers of the user 116. In another example, the haptic output devices 812(3) may comprise piezoelectric or rotary motor devices configured to provide a vibration, which may be felt by the user 116.

The facility 102 may include an interface device that comprises the sensors 122, the output devices 812, or both. For example, the tote 118 may include an interface device such as a display device 812(1) and a touch sensor 122(4). In some implementations, the interface device may include hardware processors, memory, and other elements configured to present a user interface, process input to the user interface, and so forth. Users 116, associates, or both users 116 and associates may use the interface device.

Other output devices 812(T) may also be present. For example, the other output devices 812(T) may include scent/odor dispensers, document printers, 3D printers or fabrication equipment, and so forth.

The inventory management system 124 may generate user interface data, which is then used by the interface device to present the user interface. The user interface may be configured to stimulate one or more senses of the user 116 or associate. For example, the user interface may comprise visual, audible, and haptic output.

Figure 9:
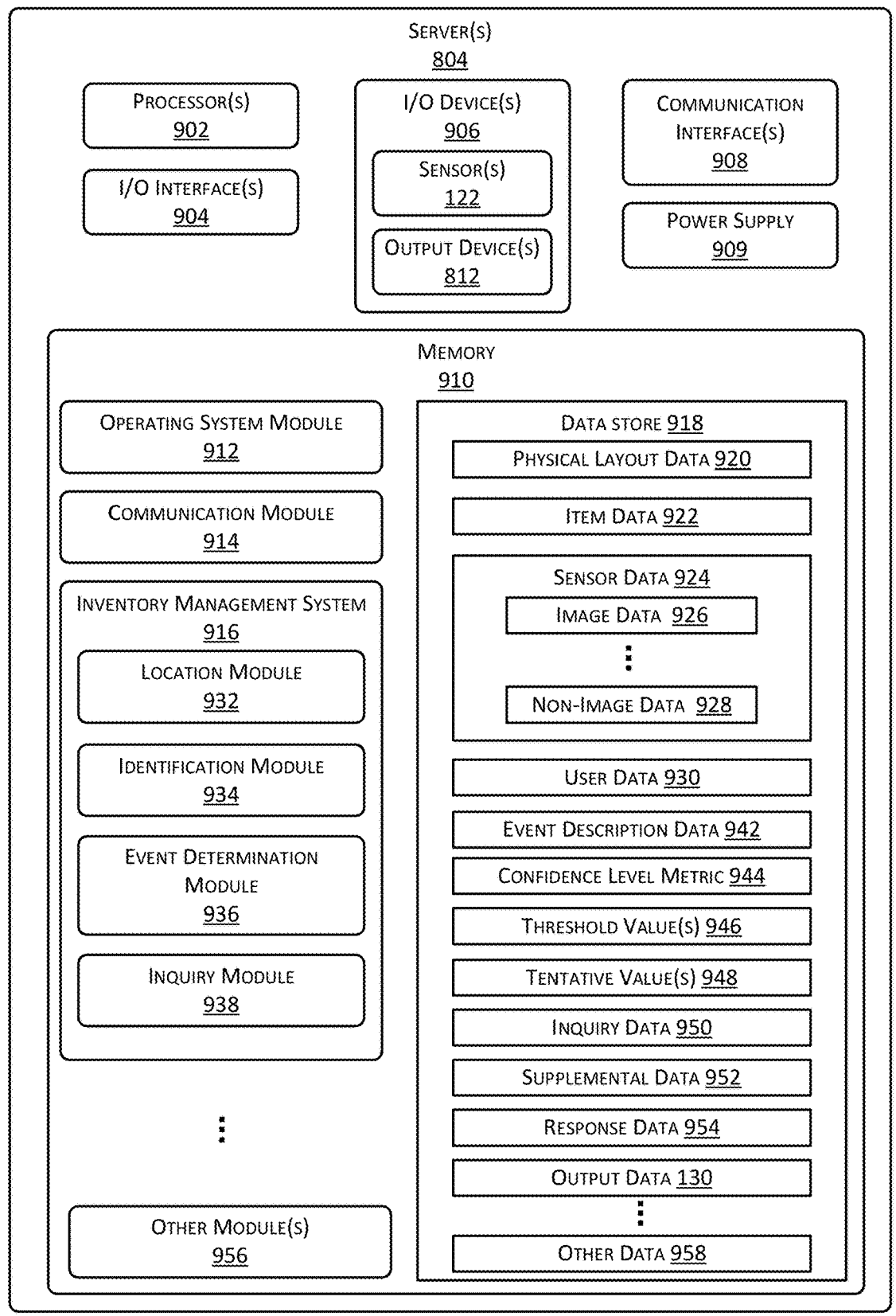
FIG. 9 illustrates a block diagram of one or more servers configured to support operation of the facility. As illustrated, the servers may host an inventory management system configured to maintain the state of the virtual shopping carts.

FIG. 9 illustrates a block diagram of the one or more servers 804. The servers 804 may be physically present at the facility 102, may be accessible by the network 802, or a combination of both. The servers 804 does not require end-user knowledge of the physical location and configuration of the system that delivers the services. Common expressions associated with the servers 804 may include "on-demand computing," "software as a service (SaaS)," "platform computing," "network-accessible platform," "cloud services," "data centers," and so forth. Services provided by the servers 804 may be distributed across one or more physical or virtual devices.

The servers 804 may include one or more hardware processors 902 (processors) configured to execute one or more stored instructions. The processors 902 may comprise one or more cores. The servers 804 may include one or more input/output (I/O) interface(s) 804 to allow the processor 902 or other portions of the servers 804 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, RS-232, and so forth.

The servers 804 may also include one or more communication interfaces 906. The communication interfaces 906 are configured to provide communications between the servers 804 and other devices, such as the sensors 122, the interface devices, routers, the access points 810, and so forth. The communication interfaces 806 may include devices configured to couple to personal area networks (PANs), wired and wireless local area networks (LANs), wired and wireless wide area networks (WANs), and so forth. For example, the communication interfaces 806 may include devices compatible with Ethernet, Wi-Fi™, and so forth. The servers 804 may also include one or more busses or other internal communications hardware or software that allow for the transfer of data between the various modules and components of the servers 804.

The servers 804 may also include a power supply 909. The power supply 909 is configured to provide electrical power suitable for operating the components in the servers 804.

As shown in FIG. 9, the servers 804 includes one or more memories 910. The memory 910 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 910 provides storage of computer-readable instructions, data structures, program modules, and other data for the operation of the servers 804. A few example functional modules are shown stored in the memory 910, although the same functionality may alternatively be implemented in hardware, firmware, or as a system on a chip (SOC).

The memory 910 may include at least one operating system (OS) module 912. The OS module 912 is configured to manage hardware resource devices such as the I/O interfaces 904, the communication interfaces 906, and provide various services to applications or modules executing on the processors 902. The OS module 912 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 910. These modules may be executed as foreground applications, background tasks, daemons, and so forth.

A communication module 914 may be configured to establish communications with one or more of the sensors 120, one or more of the devices used by associates, other servers 804, or other devices. The communications may be authenticated, encrypted, and so forth.

The memory 910 may store an inventory management system 916. The inventory management system 916 is configured to provide the inventory functions as described herein with regard to the inventory management system 124. For example, the inventory management system 916 may track movement of items 104 in the facility 102, generate user interface data, and so forth.

The inventory management system 916 may access information stored in one or more data stores 918 in the memory 910. The data store 918 may use a flat file, database, linked list, tree, executable code, script, or other data structure to store the information. In some implementations, the data store 918 or a portion of the data store 918 may be distributed across one or more other devices including other servers 804, network attached storage devices, and so forth.

The data store 918 may include physical layout data 920. The physical layout data 920 provides a mapping of physical locations within the physical layout of devices and objects such as the sensors 122, inventory locations 114, and so forth. The physical layout data 920 may indicate the coordinates within the facility 102 of an inventory location 114, sensors 122 within view of that inventory location 114, and so forth. For example, the physical layout data 920 may include camera data comprising one or more of a location within the facility 102 of an camera 122(1), orientation of the camera 122(1), the operational status, and so forth. Continuing example, the physical layout data 920 may indicate the coordinates of the camera 122(1), pan and tilt information indicative of a direction that the field of view 132 is oriented along, whether the camera 122(1) is operating or malfunctioning, and so forth.

In some implementations, the inventory management system 916 may access the physical layout data 920 to determine if a location associated with the event 126 is within the field of view 132 of one or more sensors 122. Continuing the example above, given the location within the facility 102 of the event 126 and the camera data, the inventory management system 916 may determine the cameras 122(1) that may have generated images of the event 126.

The item data 922 comprises information associated with the items 104. The information may include information indicative of one or more inventory locations 114 at which one or more of the items 104 are stored. The item data 922 may also include order data, SKU or other product identifier, price, quantity on hand, weight, expiration date, images of the item 104, detail description information, ratings, ranking, and so forth. The inventory management system 916 may store information associated with inventory management functions in the item data 922.

The data store 918 may also include sensor data 924. The sensor data 924 comprises information acquired from, or based on, the one or more sensors 122. For example, the sensor data 924 may comprise 3D information about an object in the facility 102. As described above, the sensors 122 may include an camera 122(1), which is configured to acquire one or more images. These images may be stored as the image data 926. The image data 926 may comprise information descriptive of a plurality of picture elements or pixels. Non-image data 928 may comprise information from other sensors 122, such as input from the microphones 122(5), weight sensors 122(6), and so forth.

User data 930 may also be stored in the data store 918. The user data 930 may include identity data, information indicative of a profile, purchase history, location data, images of the user 116, demographic data, and so forth. Individual users 916 or groups of users 916 may selectively provide user data 930 for use by the inventory management system 222. The individual users 916 or groups of users 916 may also authorize collection of the user data 930 during use of the facility 102 or access to user data 930 obtained from other systems. For example, the user 116 may opt-in to collection of the user data 930 to receive enhanced services while using the facility 102.

In some implementations, the user data 930 may include information designating a user 116 for special handling. For example, the user data 930 may indicate that a particular user 116 has been associated with an increased number of errors with respect to output data 130. The inventory management system 916 may be configured to use this information to apply additional scrutiny to the events 126 associated with this user 116. For example, events 126 that include an item 106 having a cost or result above the threshold amount may be provided to the associates for processing regardless of the determined level of confidence in the output data 130 as generated by the automated system.

The inventory management system 916 may include one or more of a location module 932, identification module 934, event determination module 936, and an inquiry module 938.

The location module 932 functions to determine locations of items or users within the environment of the facility (potentially as the items or users move throughout the facility) to allow the inventory management system 916 to assign certain events to the correct users. That is, the location module 932 may assign unique identifiers to users as they enter the facility and, with the users' consent, may locate the users throughout the facility 102 over the time they remain in the facility 102. The location module 932 may perform this location determination using sensor data 924, such as the image data 926. For example, the location module 932 may receive the image data 926 and may use facial-recognition techniques to identify users from the images. After identifying a particular user within the facility, the location module 932 may then locate the user within the images as the user moves throughout the facility 102. Further, should the location module 932 temporarily "lose" a particular user, the location module 932 may again attempt to identify the users within the facility based on facial recognition, and/or using other techniques such as voice recognition, or the like.

Therefore, upon receiving the indication of the time and location of the event in question, the location module 932 may query the data store 918 to determine which one or more users were at or within a threshold distance of the location of the event at the particular time of the event. Further, the location module 932 may assign different confidence levels to different users, with the confidence levels indicating how likely it is that each corresponding user is the user that is in fact associated with the event of interest. In some instances, the location module 932 returns, The location module 932 may access the sensor data 924 in order to determine this location data of the user and/or items. The location data provides information indicative of a location of an object, such as the item 104, the user 116, the tote 218, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 114 along a heading of 169°, and so forth. For example, the location data may indicate that the user 116 is 25.2 m along the aisle 212(1) and standing in front of the inventory location 114. In comparison, a relative location may indicate that the user 116 is 32 cm from the tote 218 at a heading of 73° with respect to the tote 118. The location data may include orientation information, such as which direction the user 116 is facing. The orientation may be determined by the relative direction the user's 116 body is facing. In some implementations, the orientation may be relative to the interface device. Continuing the example, the location data may indicate that the user 116 is oriented with a heading of 0°, or looking north. In another example, the location data may indicate that the user 116 is facing towards the interface device.

The identification module 934 is configured to identify an object. In one implementation, the identification module 934 may be configured to identify an item 104. In another implementation, the identification module 934 may be configured to identify the user 116. For example, the identification module 934 may use facial recognition techniques to process the image data 926 and determine the identity data of the user 116 depicted in the images by comparing the characteristics in the image data 926 with previously stored results. The identification module 934 may also access data from other sensors 122, such as from the RFID reader 122(8), the RF receiver 112(9), fingerprint sensors, and so forth.

Facial recognition may include analyzing facial characteristics which are indicative of one or more facial features in an image, 3D data, or both. For example, the face of the user 116 may be detected within one or more of the images of the image data 926. The facial features include measurements of, or comparisons between, facial fiducials or ordinal points. The facial features may include eyes, mouth, lips, nose, chin, ears, face width, skin texture, 3D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the user data 930 of the person in the image or to distinguish one user 116 from another.

The event determination module 936 is configured to process the sensor data 924, as well as data received from associate applications executing on respective associate computing devices 136, and generate output data 130. The event determination module 936 may access information stored in the data store 918 including, but not limited to, event description data 942, confidence levels 944, or threshold values 946.

The event description data 942 comprises information indicative of one or more events 126. For example, the event description data 942 may comprise predefined profiles that designate movement of an item 104 from an inventory location 114 with the event 126 of "pick". The event description data 942 may be manually generated or automatically generated. The event description data 942 may include data indicative of triggers associated with events occurring in the facility 102. An event may be determined as occurring upon detection of the trigger. For example, sensor data 924 such as a change in weight from a weight sensor 122(6) at an inventory location 114 may trigger detection of an event of an item 104 being added or removed from the inventory location 114. In another example, the trigger may comprise an image of the user 116 reaching a hand toward the inventory location 114. In yet another example, the trigger may comprise two or more users 116 approaching to within a threshold distance of one another.

The event determination module 936 may process the sensor data 924 using one or more techniques including, but not limited to, artificial neural networks, classifiers, decision trees, support vector machines, Bayesian networks, and so forth. For example, the event determination module 936 may use a decision tree to determine occurrence of the "pick" event 126 based on sensor data 924. The event determination module 936 may further use the sensor data 924 to determine one or more tentative results 948. The one or more tentative results 948 comprise data associated with the event 126. For example, where the event 126 comprises a disambiguation of users 916, the tentative results 948 may comprise a list of possible user 116 identities. In another example, where the event 126 comprises a disambiguation between items 104, the tentative results 948 may comprise a list of possible item identifiers. In some implementations, the tentative result 948 may indicate the possible action. For example, the action may comprise the user 116 picking, placing, moving an item 104, damaging an item 104, providing gestural input, and so forth.

In some implementations, the tentative results 948 may be generated by other modules. For example, the tentative results 948 such as one or more possible identities or locations of the user 116 involved in the event 126 may be generated by the location module 932. In another example, the tentative results 948 such as possible items 104 that may have been involved in the event 126 may be generated by the identification module 934.

The event determination module 936 may be configured to provide a confidence level 944 associated with the determination of the tentative results 948. The confidence level 944 provides indicia as to the expected level of accuracy of the tentative result 948. For example, a low confidence level 944 may indicate that the tentative result 948 has a low probability of corresponding to the actual circumstances of the event 126. In comparison, a high confidence level 944 may indicate that the tentative result 948 has a high probability of corresponding to the actual circumstances of the event 126.

In some implementations, the tentative results 948 having confidence levels 944 that exceed the threshold result 946 may be deemed to be sufficiently accurate and thus may be used as the output data 130. For example, the event determination module 936 may provide tentative results 948 indicative of the three possible items 104(1), 104(2), and 104(3) corresponding to the "pick" event 126. The confidence levels 944 associated with the possible items 104(1), 104(2), and 104(3) may be 25%, 70%, 92%, respectively. Continuing the example, the threshold result 946 may be set such that confidence level 944 of 90% are deemed to be sufficiently accurate. As a result, the event determination module 936 may designate the "pick" event 126 as involving item 104(3).

The inquiry module 938 may be configured to use at least a portion of the sensor data 924 associated with the event 126 to generate inquiry data 950. In some implementations, the inquiry data 950 may include one or more of the tentative results 948 or supplemental data 952. The inquiry module 938 may be configured to provide inquiry data 950 to one or more devices associated with one or more human associates.

An associate user interface is presented on the respective devices of associates. The associate may generate response data 954 by selecting a particular tentative result 948, entering new information, indicating that they are unable to answer the inquiry, and so forth.

The supplemental data 952 comprises information associated with the event 126 or that may be useful in interpreting the sensor data 924. For example, the supplemental data 952 may comprise previously stored images of the items 104. In another example, the supplemental data 952 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 926 during presentation to an associate.

The inquiry module 938 processes the response data 954 provided by the one or more associates. The processing may include calculating one or more statistical results associated with the response data 954. For example, statistical results may include a count of the number of times associates selected a particular tentative result 948, determination of a percentage of the associates that selected a particular tentative result 948, and so forth.

The inquiry module 938 is configured to generate the output data 130 based at least in part on the response data 954. For example, given that a majority of the associates returned response data 954 indicating that the item 104 associated with the "pick" event 126 is item 104(5), the output data 130 may indicate that the item 104(5) was picked.

The inquiry module 938 may be configured to selectively distribute inquiries to particular associates. For example, some associates may be better suited to answering particular types of inquiries. Performance data, such as statistical data about the performance of the associates, may be determined by the inquiry module 938 from the response data 954 provided by the associates. For example, information indicative of a percentage of different inquiries in which the particular associate selected response data 954 that disagreed with the majority of associates may be maintained. In some implementations, test or practice inquiry data 950 having a previously known correct answer may be provided to the associate for training or quality assurance purposes. The determination of the set of associates to use may be based at least in part on the performance data.

By using the inquiry module 938, the event determination module 936 may be able to provide high reliability output data 130 that accurately represents the event 126. The output data 130 generated by the inquiry module 938 from the response data 954 may also be used to further train the automated systems used by the inventory management system 916. For example, the sensor data 924 and the output data 130, based on response data 954, may be provided to one or more of the modules of the inventory management system 916 for training in process improvement. Continuing the example, this information may be provided to an artificial neural network, Bayesian network, and so forth, to further train these systems such that the confidence level 944 and the tentative results 948 produced in the future for the same or similar input is improved.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer-readable media storing computer-executable instructions that, when executed, cause the one or more processors to perform acts comprising:
receiving a first indication that a customer associated with a customer identifier has entered a facility;
storing an association between the customer identifier and a session identifier;
receiving, from a sensor, sensor data indicative of the customer picking an item from a shelf in the facility, the item associated with an item identifier;
updating virtual-cart data associated with the session identifier to indicate addition of the item identifier;
receiving a second indication that an image that is associated with the customer identifier and is presented on a display of a computing device has been scanned by an associate mobile computing device operated by an associate at the facility;
receiving, from the associate mobile computing device, the item identifier and a request to remove the item from the virtual-cart data associated with the session identifier;
identifying, using the second indication, the association between the customer identifier and the session identifier;
updating, based at least in part on receiving the item identifier and the request to remove the item, the virtual-cart data associated with the session identifier to indicate removal of the item identifier;
sending, to the computing device, a third indication that the item identifier associated with the item previously picked from the shelf by the customer has been removed from the virtual-cart data that is associated with the customer;
receiving a fourth indication that the customer has exited the facility;
generating receipt data based on the virtual-cart data associated with the session identifier at or near a time of the customer exiting the facility, the virtual-cart data not including the item identifier associated with the item; and
sending the receipt data to the computing device.

2. A method comprising:
receiving sensor data indicative of a customer picking an item in a facility, the item associated with an item identifier;
updating virtual-cart data associated with the customer to indicate addition of the item identifier;
receiving a first indication of a location within the facility of at least one of an associate computing device or an associate at the facility operating the associate computing device;

identifying a region around the location, the region including the customer;
selecting image data corresponding to the region;
sending, to the associate computing device, the image data corresponding to the region for identifying the customer;
receiving, from the associate computing device and based at least in part on the image data, data identifying the customer;
receiving, from the associate computing device, data representing the item identifier;
receiving, from the associate computing device, a request to update the virtual-cart data associated with the customer to indicate removal of the item identifier;
updating, based at least in part on receiving the request to update the virtual-cart data, the virtual-cart data associated with the customer to indicate the removal of the item identifier;
receiving a second indication that the customer has exited the facility;
generating receipt data based on the virtual-cart data at or near a time of the customer exiting the facility, the virtual-cart data not including the item identifier associated with the item; and
sending the receipt data to a computing device.

3. The method as recited in claim 2, wherein the receiving the data identifying the customer from the associate computing device comprises receiving an indication that an imaging device of the associate computing device has captured an image associated with a customer identifier of the customer.

4. The method as recited in claim 3, wherein the image associated with the customer identifier comprises at least one of a quick-response (QR) code, a barcode, an image, or an alphanumeric string presented on a display of a mobile computing device of the customer.

5. The method as recited in claim 2, further comprising:
identifying one or more cameras configured to acquire image data of at least a portion of the region; and
sending image data acquired by the one or more cameras to the associate computing device.

6. The method as recited in claim 5, wherein the receiving the data identifying the customer comprises receiving an indication that a customer represented in the sent image data has been selected as the customer on the associate computing device.

7. The method as recited in claim 2, further comprising:
determining that at least a first customer and a second customer are currently located within the region;
retrieving a first image of the first customer;
retrieving a second image of the second customer; and
sending the first image and the second image to the associate computing device for presentation on a display of the associate computing device.

8. The method as recited in claim 7, wherein the receiving of the data identifying the customer from the associate computing device comprises receiving a selection of the first image of the first customer.

9. The method as recited in claim 2, wherein the receiving the data identifying the customer comprises receiving an indication that a customer represented in the at least a portion of the image data has been selected as the customer on the associate computing device.

10. The method as recited in claim 2, wherein identifying the region comprises identifying an area of the facility that is within a threshold distance of the location of the at least one of the associate computing device or the associate.

11. The method as recited in claim 2, further comprising identifying one or more cameras having a field-of-view of the at least one of the associate computing device or the associate.

12. A system comprising:
one or more processors; and
one or more computer-readable media storing computer-executable instructions that, when executed, cause the one or more processors to perform acts comprising:
receiving sensor data indicative of a customer picking an item in a facility, the item associated with an item identifier;
updating virtual-cart data associated with the customer to indicate addition of the item identifier;
receiving a first indication of a location within the facility of at least one of an associate computing device or an associate at the facility operating the associate computing device;
identifying a region around the location, the region including the customer;
selecting image data corresponding to the region;
sending, to the associate computing device, the image data corresponding to the region for identifying the customer;
receiving, from the associate computing device and based at least in part on the image data, data identifying the customer;
receiving, from the associate computing device, data representing the item identifier;
receiving, from the associate computing device, a request to update the virtual-cart data associated with the customer to indicate removal of the item identifier;
updating the virtual-cart data associated with the customer to indicate the removal of the item identifier;
receiving a second indication that the customer has exited the facility;
generating receipt data based on the virtual-cart data at or near a time of the customer exiting the facility, the virtual-cart data not including the item identifier associated with the item; and
sending the receipt data to a mobile computing device of the customer.

13. The system as recited in claim 12, wherein the receiving the data identifying the customer from the associate computing device comprises receiving an indication that an imaging device of the associate computing device has captured an image associated with a customer identifier of the customer.

14. The system as recited in claim 13, wherein the image associated with the customer identifier comprises at least one of a quick-response (QR) code, a barcode, an image, or an alphanumeric string presented on a display of a mobile computing device of the customer.

15. The system as recited in claim 12, the acts further comprising:
identifying one or more cameras configured to acquire image data of at least a portion of the region; and
sending image data acquired by the one or more cameras to the associate computing device.

16. The system as recited in claim 15, wherein the receiving the data identifying the customer comprises receiving an indication that a customer represented in the sent image data of the region has been selected as the customer on the associate computing device.

17. The system as recited in claim 12, the acts further comprising:

determining that at least a first customer and a second customer are currently located within the region;

retrieving a first image of the first customer;

retrieving a second image of the second customer; and sending the first image and the second image to the associate computing device for presentation on a display of the associate computing device.

18. The system as recited in claim 12, wherein the receiving the data identifying the customer comprises receiving an indication that a customer represented in the at least a portion of the image data has been selected as the customer on the associate computing device.

19. The system as recited in claim 12, wherein identifying the region comprises identifying an area of the facility that is within a threshold distance of the location of the at least one of the associate computing device or the associate.

* * * * *